US012770537B2

(12) United States Patent
Fukuda et al.

(10) Patent No.: US 12,770,537 B2
(45) Date of Patent: Oct. 20, 2026

(54) PROJECTION CONTROL APPARATUS TO PROJECT OPTICAL ILLUSION RELATED TO CAUTION-RELATED FEATURE AND PROJECTION CONTROL METHOD

(71) Applicant: Mitsubishi Electric Mobility Corporation, Tokyo (JP)

(72) Inventors: Keisaku Fukuda, Tokyo (JP); Mitsuo Shimotani, Tokyo (JP); Tadashi Miyahara, Tokyo (JP)

(73) Assignee: MITSUBISHI ELECTRIC MOBILITY CORPORATION, Tokyo (JP)

( * ) Notice: Subject to any disclaimer, the term of this patent is extended or adjusted under 35 U.S.C. 154(b) by 172 days.

(21) Appl. No.: 18/286,767

(22) PCT Filed: Jun. 1, 2021

(86) PCT No.: PCT/JP2021/020787
§ 371 (c)(1),
(2) Date: Oct. 13, 2023

(87) PCT Pub. No.: WO2022/254570
PCT Pub. Date: Dec. 8, 2022

(65) Prior Publication Data

US 2024/0127725 A1 Apr. 18, 2024

(51) Int. Cl.
*G09G 3/00* (2006.01)
*B60Q 1/50* (2006.01)

(52) U.S. Cl.
CPC ............... *G09G 3/001* (2013.01); *B60Q 1/50* (2013.01); *G09G 2354/00* (2013.01); *G09G 2380/10* (2013.01)

(58) Field of Classification Search
None
See application file for complete search history.

(56) References Cited

U.S. PATENT DOCUMENTS 9,969,325 B2 * 5/2018 Lection .................. B60Q 1/545
11,230,223 B1 * 1/2022 Lee ........................ B60Q 1/085
(Continued)

FOREIGN PATENT DOCUMENTS

JP 2002-225617 A 8/2002
JP 2008-287669 A 11/2008
(Continued)

OTHER PUBLICATIONS

Notice of Reasons for Refusal mailed Nov. 7, 2023, in JP Application No. 2023-525209, 13 pages.
(Continued)

*Primary Examiner* — Jason A Pringle-Parker
(74) *Attorney, Agent, or Firm* — XSENSUS LLP

(57) ABSTRACT

A caution-required feature detector in a projection control apparatus detects a caution-required feature that is a feature with a solid shape that impacts on traveling of a subject vehicle. An optical illusion image generating unit generates an optical illusion image that recalls the solid shape of the caution-required feature. An alert determination unit determines whether alerting the caution-required feature is necessary. A projector controller causes a projector to project the optical illusion image at a position corresponding to a position of the caution-required feature determined as requiring the alert.

17 Claims, 24 Drawing Sheets

(56) References Cited

U.S. PATENT DOCUMENTS

| | | | | |
|---|---|---|---|---|
| 11,794,641 | B2 * | 10/2023 | Spoor | B60Q 1/545 |
| 2003/0025078 | A1 * | 2/2003 | Yamaguchi | H05B 47/11<br>250/330 |
| 2014/0267415 | A1 * | 9/2014 | Tang | G06T 11/60<br>345/633 |
| 2014/0362195 | A1 * | 12/2014 | Ng-Thow-Hing | G06V 40/20<br>348/51 |
| 2016/0326724 | A1 * | 11/2016 | Hartman | H05B 47/115 |
| 2017/0309050 | A1 * | 10/2017 | Sasaki | G06V 20/56 |
| 2018/0024640 | A1 | 1/2018 | Yeom et al. | |
| 2018/0031384 | A1 * | 2/2018 | Lee | G06V 20/58 |
| 2018/0198955 | A1 * | 7/2018 | Watanabe | B60K 35/00 |
| 2018/0322783 | A1 * | 11/2018 | Toyoda | G06N 20/00 |
| 2019/0189014 | A1 | 6/2019 | Murai | |
| 2020/0164796 | A1 * | 5/2020 | Garrett | G08G 1/165 |

FOREIGN PATENT DOCUMENTS

| | | | |
|---|---|---|---|
| JP | 2009-104531 | A | 5/2009 |
| JP | 2019-051793 | A | 4/2019 |
| JP | 2019-109707 | A | 7/2019 |
| JP | 2019-139273 | A | 8/2019 |
| JP | 2020-013247 | A | 1/2020 |

OTHER PUBLICATIONS

International Search Report and Written Opinion mailed on Jul. 20, 2021, received for PCT Application PCT/JP2021/020787, filed on Jun. 1, 2021, 12 pages including English Translation.

* cited by examiner

PROJECTION CONTROL APPARATUS TO PROJECT OPTICAL ILLUSION RELATED TO CAUTION-RELATED FEATURE AND PROJECTION CONTROL METHOD

CROSS-REFERENCE TO RELATED APPLICATION

This application is based on PCT filing PCT/JP2021/020787, filed Jun. 1, 2021, the entire contents of which are incorporated herein by reference.

TECHNICAL FIELD

The present disclosure relates to a technology for projecting an image from a vehicle onto, for example, a road surface.

BACKGROUND ART

Various technologies for controlling light emitted from vehicles have been proposed to improve the safety of the vehicles. The technologies include a headlamp (headlight) system that controls an emission direction of light of a headlamp in consideration of a road shape ahead of a vehicle, and a driving assistance device that projects images such as graphics and a symbol onto a road surface ahead of a vehicle (for example, Patent Documents 1 and 2 below).

PRIOR ART DOCUMENT

Patent Document

Patent Document 1: Japanese Patent Application Laid-Open No. 2002-225617

Patent Document 2: Japanese Patent Application Laid-Open No. 2008-287669

Problem to be Solved by the Invention

The aforementioned technologies can alert a driver to the existence of a feature requiring caution (hereinafter referred to as a "caution-required feature") in driving a vehicle. The technologies, however, do not allow the driver to intuitively understand a solid shape of the caution-required feature. In a situation where the driver has difficulty in visually recognizing a caution-required feature, particularly, at night or in bad weather, etc., a technology that allows the driver to easily understand a solid shape of the caution-required feature is desired.

The present invention has been conceived to solve the problem, and has an object of providing a projection control apparatus that can alert a driver of a vehicle to the existence of a caution-required feature while allowing the driver to intuitively understand a solid shape of the caution-required feature.

Means to Solve the Problem

A projection control apparatus according to the present disclosure includes: a caution-required feature detector to detect a caution-required feature that is a feature with a solid shape that impacts on traveling of a subject vehicle; an optical illusion image generating unit to generate an optical illusion image that recalls the solid shape of the caution-required feature; an alert determination unit to determine whether alerting the caution-required feature is necessary; and a projection controller to cause a projector to project the optical illusion image at a position corresponding to a position of the caution-required feature determined as requiring the alert.

Effects of the Invention

The present disclosure can alert a driver of a vehicle to the existence of a caution-required feature while allowing the driver to intuitively understand a solid shape of the caution-required feature.

The objects, features, aspects, and advantages of the present disclosure will become more apparent from the following detailed description and the accompanying drawings.

DESCRIPTION OF EMBODIMENTS

Embodiment 1

Figure 1:
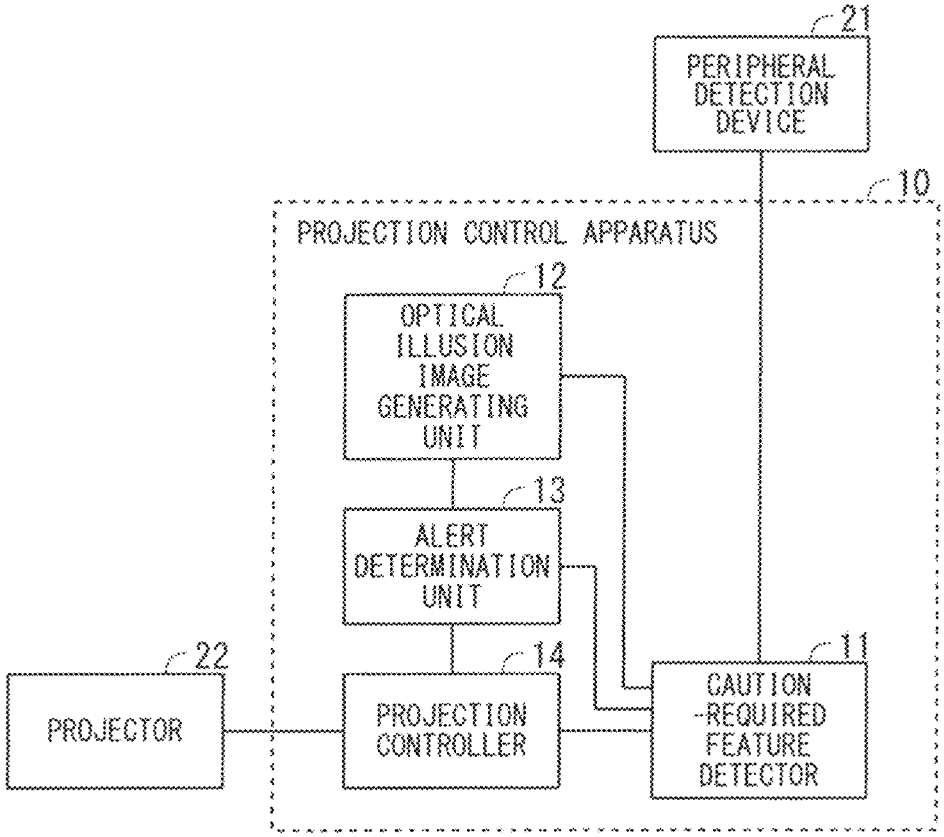
FIG. 1 illustrates a configuration of a projection control system according to Embodiment 1.

FIG. 1 illustrates a configuration of a projection control system according to Embodiment 1. This projection control system is mounted on a vehicle, and projects, onto, for example, a road surface, an image for alerting a driver to the existence of a caution-required feature around the vehicle. The caution-required feature in this disclosure is defined as a feature with a solid shape that impacts on the traveling of a vehicle (for example, could be an obstacle in traveling). Furthermore, the vehicle on which the projection control system is mounted will be referred to as a "subject vehicle".

The projection control system according to Embodiment 1 includes a projection control apparatus 10, and a peripheral detection device 21 and a projector 22 that are connected to the projection control apparatus 10 as illustrated in FIG. 1.

The peripheral detection device 21 is an in-vehicle device with a function of detecting a feature existing around a subject vehicle, and can include, for example, sensors such as an ultrasound sensor, a millimeter wave radar, light detection and ranging (LiDAR), and an image analyzer that detects a feature from images captured around the subject vehicle by cameras (including an infrared camera). The peripheral detection device 21 can detect, for example, a position (a distance and a direction from the subject vehicle) and a shape of the detected feature. The peripheral detection device 21 may also have a function of detecting information on an environment around the subject vehicle (for example, brightness, temperature, and weather) besides the function of detecting a feature.

The projector 22 is an in-vehicle device that illuminates an image onto, for example, a road surface around the subject vehicle. The projector 22 may be a dedicated device for projecting an image, or a device that projects an image using laser light emitted by a headlamp.

The projection control apparatus 10 is an in-vehicle apparatus that controls the projector 22 based on a result of a feature detected by the peripheral detection device 21. The projection control apparatus 10 is not necessarily installed in the subject vehicle, and may be implemented by an application program to be executed by a mobile device that can be brought into a vehicle, such as a mobile phone, a smartphone, and a portable navigation device (PND). A part of functions of the projection control apparatus 10 may be implemented by a server that is installed outside the subject vehicle and can communicate with the projection control apparatus 10.

As illustrated in FIG. 1, the projection control apparatus 10 includes a caution-required feature detector 11, an optical illusion image generating unit 12, an alert determination unit 13, and a projection controller 14.

The caution-required feature detector 11 detects a caution-required feature around the subject vehicle (a feature with a solid shape that impacts on the traveling of the subject vehicle), based on the result of the feature detected by the peripheral detection device 21. Assumed caution-required features include structures on a road through which the subject vehicle is traveling, for example, a median strip, a curb, a sidewalk, and a gutter. The structures each has a step (a height or a depth) with a certain dimension or more, with respect to the road.

For example, road surfaces in particular states may be caution-required features. The road surfaces include a road surface on which snow is accumulated, an icy road surface, a road surface with puddles, a gravel road surface, a road surface with a rut, a road surface with a slit, a collapsed road surface, and a cracked road surface. For example, objects not installed on roads may also be caution-required features. The objects include an on-street parking vehicle and a pole of a road construction site.

The optical illusion image generating unit 12 generates an optical illusion image that recalls a solid shape of the caution-required feature detected by the caution-required feature detector 11. The optical illusion image generated by the optical illusion image generating unit 12 is an image to be perceived as if a feature existed through optical illusion when viewed from the driver of the subject vehicle. The optical illusion image generating unit 12 can generate the optical illusion image by, for example, a rendering method that conforms to one-point perspective with respect to positions of eyes (an eyepoint) of the driver.

Furthermore, the optical illusion image is not necessarily an image that duplicates an actual solid shape of a caution-required feature but may be any that recalls a rough solid shape (for example, a protruding shape or a depressed shape) of the caution-required feature. For example, when a caution-required feature has a shape protruding from a road surface, such as a median strip, a curb, a sidewalk, or a pole of a road construction site, the optical illusion image generating unit 12 should generate an optical illusion image to be perceived as a protruding shape. Furthermore, when a caution-required feature has a shape depressed from a road surface, such as a gutter or a collapsed road surface, the optical illusion image generating unit 12 should generate an optical illusion image to be perceived as a depressed shape. When a caution-required feature is a road surface on which snow is accumulated, an icy road surface, a road surface with puddles, a gravel road surface, a road surface with a rut, a road surface with a slit, a collapsed road surface, or a cracked road surface, the optical illusion image generating unit 12 should generate an optical illusion image with an arbitrary shape that recalls, for example, the accumulated snow, the icy surface, the puddles, the gravel, the rut, the slit, the collapse, and the crack, respectively. Furthermore, the shape of the optical illusion image may be different from the actual shape. When the caution-required feature detector 11 can detect an actual solid shape of the caution-required feature, the optical illusion image generating unit 12 may generate an optical illusion image that simulates the actual solid shape.

The alert determination unit 13 determines whether alerting the caution-required feature detected by the caution-required feature detector 11 is necessary. Specifically, the alert determination unit 13 determines whether alerting the driver of the subject vehicle to the existence of the caution-required feature is necessary. Hereinafter, the caution-required feature determined by the alert determination unit 13 as requiring an alert may be referred to as an "alert target feature".

There are various criteria for determining whether alerting a caution-required feature is necessary, that is, criteria for determining whether the caution-required feature is an alert target feature. Some examples of the criteria will be described hereinafter.

For example, the urgency of a caution-required feature can be a criterion for determining whether alerting the caution-required feature is necessary. Since the urgency of a caution-required feature at a position closer to the subject vehicle is high, the alert determination unit 13 may determine a caution-required feature whose distance from the subject vehicle is smaller than or equal to a predefined threshold (for example, 100 m) as an alert target feature.

Furthermore, the alert determination unit 13 may calculate a time at which the subject vehicle will arrive at a caution-required feature from a traveling speed of the subject vehicle, and determine a caution-required feature with the calculated arrival time less than or equal to a predefined threshold (for example, seven seconds) as an alert target feature.

The threshold need not be a fixed value. The threshold may be increased as a traveling speed of the subject vehicle is higher. The threshold may be increased as a braking distance of the subject vehicle is longer. The braking distance of the subject vehicle depends on a traveling speed of the subject vehicle and a coefficient of friction of a road surface. Furthermore, the threshold may be changed according to a type (an attribute) of a caution-required feature. For example, the threshold may be increased for a caution-required feature having difficulty in being visually determined, such as an icy road surface, so that the caution-required feature is alerted earlier.

Furthermore, when the subject vehicle implements automated driving, the urgency of a caution-required feature is low for the driver. This is because the subject vehicle automatically avoids the caution-required feature. Thus, the alert determination unit 13 may determine whether alerting the caution-required feature is necessary, based on an automated driving level implemented by the subject vehicle (an automated driving level defined by the Society of Automotive Engineers (SAE)). For example, when the subject vehicle is operated at level 4 or 5 of the automated driving, the driver need not monitor a behavior of the subject vehicle or a situation around the subject vehicle. Thus, the alert determination unit 13 may determine that alerting the caution-required feature is unnecessary. When the subject vehicle is operated at level 3 of the automated driving, whether alerting the caution-required feature is necessary may be defined according to a specification of an automated driving apparatus, or may be set by the driver.

While the lane keeping function is active even with the subject vehicle being operated at levels lower than level 3 of the automated driving, the alert determination unit 13 may determine that alerting a caution-required feature outside a lane through which the subject vehicle is traveling is unnecessary. Similarly, while automatic braking or speed control that is suitable for a situation ahead of the subject vehicle is active even with the subject vehicle being operated at levels lower than level 3 of the automated driving, the alert determination unit 13 may exclude a road surface from alert target features.

For example, the recognition difficulty of a caution-required feature can be a criterion for determining whether alerting the caution-required feature is necessary. For example, since the driver has difficulty in recognizing a caution-required feature whose part or entirety is hidden by, for example, accumulated snow, mud, or a roadside tree and cannot be seen by the driver, the necessity of determining the caution-required feature as an alert target is high. Thus, the alert determination unit 13 may determine a part of a caution-required feature which accounts for a certain rate (for example, 50%) or higher and which cannot be visually recognized from the subject vehicle as an alert target feature.

Furthermore, since the driver has difficulty in recognizing a caution-required feature in a situation where the surrounding of the subject vehicle is dark, the necessity of determining the caution-required feature as an alert target feature is high in such a situation. Thus, the alert determination unit 13 may determine that alerting the caution-required feature is necessary when the brightness around the subject vehicle is lower than or equal to a predefined threshold. Furthermore, when a headlamp or a width indicator (small lamp) of the subject vehicle is lit, it is highly probable that the surrounding of the subject vehicle is dark. Thus, the alert determination unit 13 may determine that alerting the caution-required feature is necessary when the headlamp or the width indicator of the subject vehicle is lit.

A weather condition around the subject vehicle can be a criterion for determining whether alerting a caution-required feature is necessary. For example, since the driver has difficulty in recognizing a caution-required feature in bad weather causing low visibility, such as rain, snow, or fog, the alert determination unit 13 may determine that alerting a caution-required feature is necessary in bad weather. Furthermore, the alert determination unit 13 may determine that alerting a caution-required feature is necessary when determining that a road surface highly probably becomes icy, from an outside-air temperature or a humidity. The alert determination unit 13 may obtain information on a weather condition from, for example, a temperature sensor, a humidity sensor, or a rain sensor, or by communicating with a weather information distribution system.

Furthermore, the recognition of the driver on a caution-required feature can be a criterion for determining whether alerting the caution-required feature is necessary. For example, a driver sensing device (not illustrated) of the subject vehicle determines the recognition of the driver on a caution-required feature from the movement of the line of sight of the driver. Then, the alert determination unit 13 may determine whether alerting the caution-required feature is necessary, based on the determination result. For example, the alert determination unit 13 may determine, as an alert target feature, a caution-required feature whose recognition of the driver is lower than or equal to a predefined threshold.

The projection controller 14 controls the projector 22, and causes the projector 22 to display, on a road surface, etc., an image for alerting the existence of a caution-required feature (an alert target feature) determined by the alert determination unit 13 as requiring the alert. Specifically, the projection controller 14 causes the projector 22 to project the optical illusion image generated by the optical illusion image generating unit 12 at a position corresponding to the position of the alert target feature to alert the alert target feature. Here, the "position corresponding to the position of the alert target feature" is not limited to the position identical to the position of the alert target feature but should be a position at which the position of the alert target feature can be understood by projection of the optical illusion image. Specifically, examples of the "position corresponding to the position of the alert target feature" include the proximity of the alert target feature, such as the periphery of the alert target feature and a position adjacent to the alert target feature.

Figure 2:
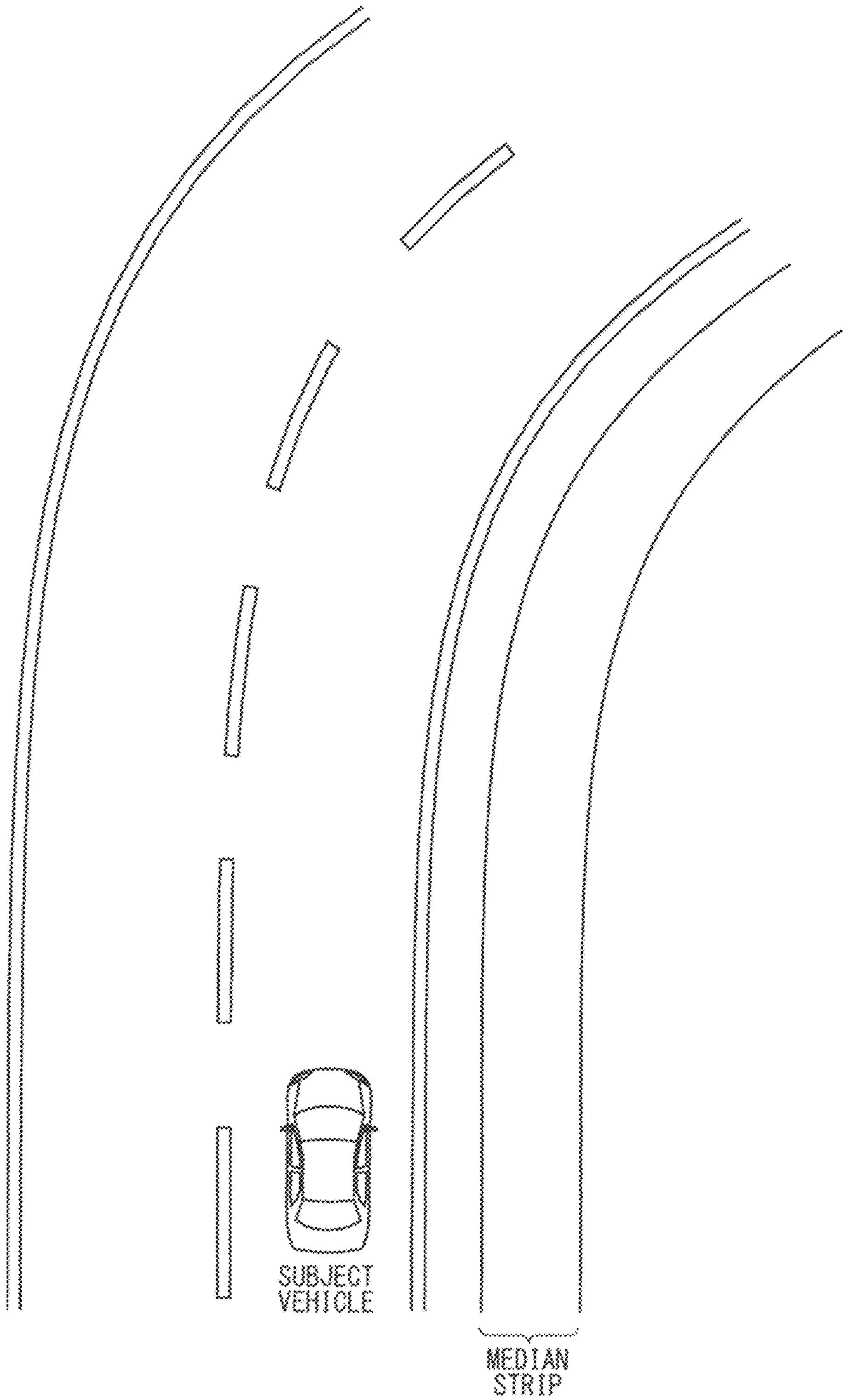
FIG. 2 illustrates an example road through which a subject vehicle is traveling.
Figure 3:
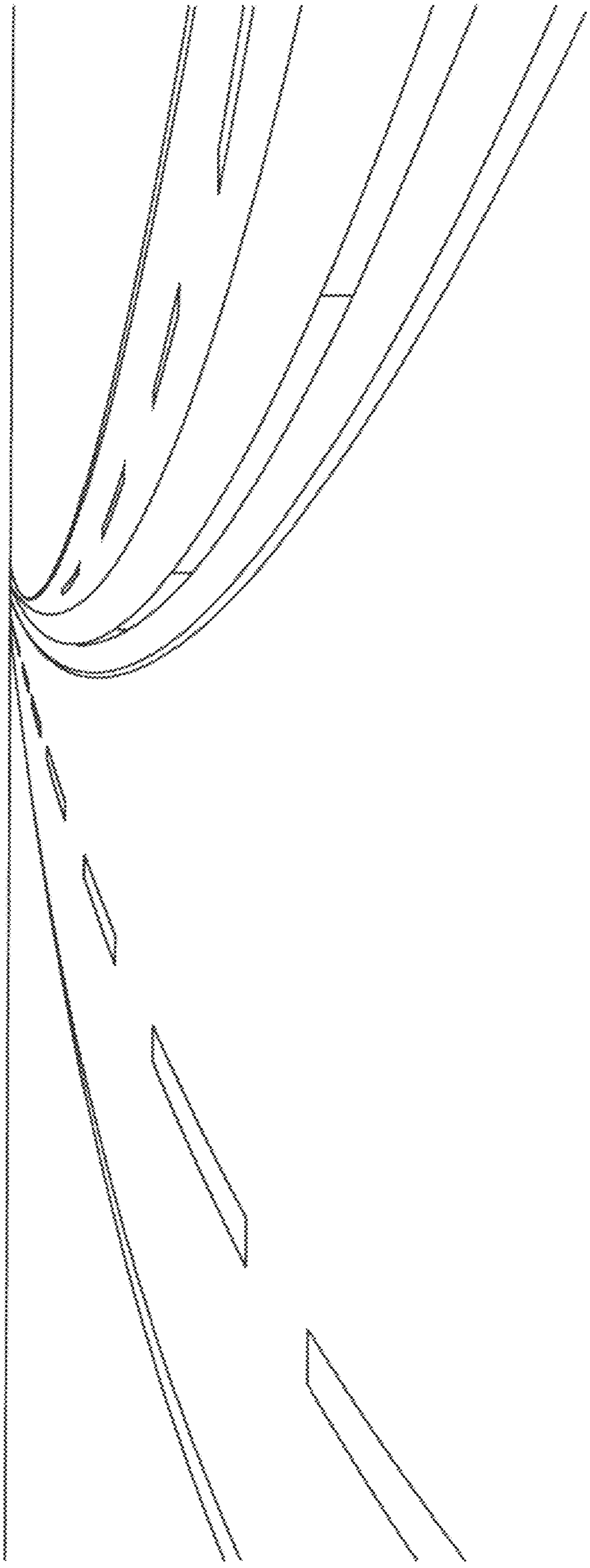
FIG. 3 illustrates an example front view from the subject vehicle.

Here, specific example operations of the projection control system according to Embodiment 1 will be described. Assume that, for example, the subject vehicle on which the projection control system is mounted is traveling through a road as illustrated in FIG. 2. As illustrated in FIG. 2, a median strip exists to the right of a lane through which the subject vehicle is traveling. A view as illustrated in FIG. 3 is seen ahead from the driver's seat of the subject vehicle.

In a situation of FIG. 2, the peripheral detection device 21 detects a median strip as a feature around the subject vehicle. Since the median strip has a solid shape that impacts on the traveling of the subject vehicle, the caution-required feature detector 11 of the projection control apparatus 10 detects the median strip detected by the peripheral detection device 21 as a caution-required feature.

Figure 4:
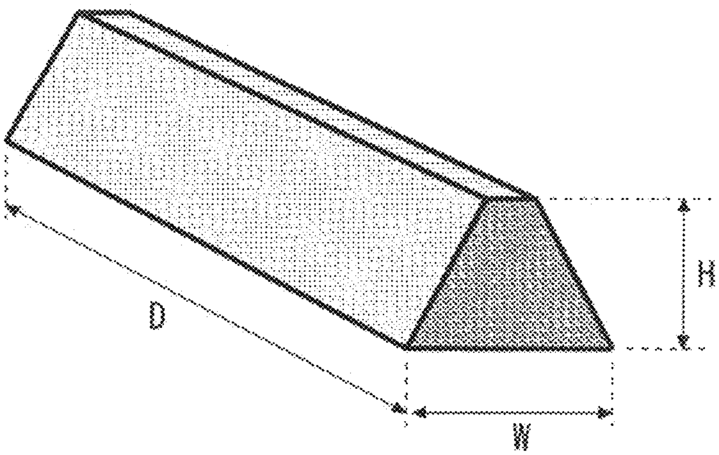
FIG. 4 illustrates an example optical illusion image of a protruding shape.

The optical illusion image generating unit 12 generates an optical illusion image that recalls the solid shape of the median strip that is an alert target feature. Since the median strip protrudes from a road surface, the optical illusion image generating unit 12 generates, for example, an optical illusion image of a protruding shape as illustrated in FIG. 4 as an optical illusion image for the median strip. "H", "W", and "D" in FIG. 4 do not represent planar dimensions of the optical illusion image but represent a virtual height (or a virtual depth), a virtual width, and a virtual depth, respectively, of the optical illusion image.

The alert determination unit 13 determines whether alerting the median strip as an alert target feature is necessary. For example, when determining that alerting a caution-required feature whose distance from the subject vehicle is smaller than or equal to 100 m is necessary, the alert determination unit 13 determines a portion of the median strip up to 100 m from the subject vehicle as a caution-required feature.

Figure 5:
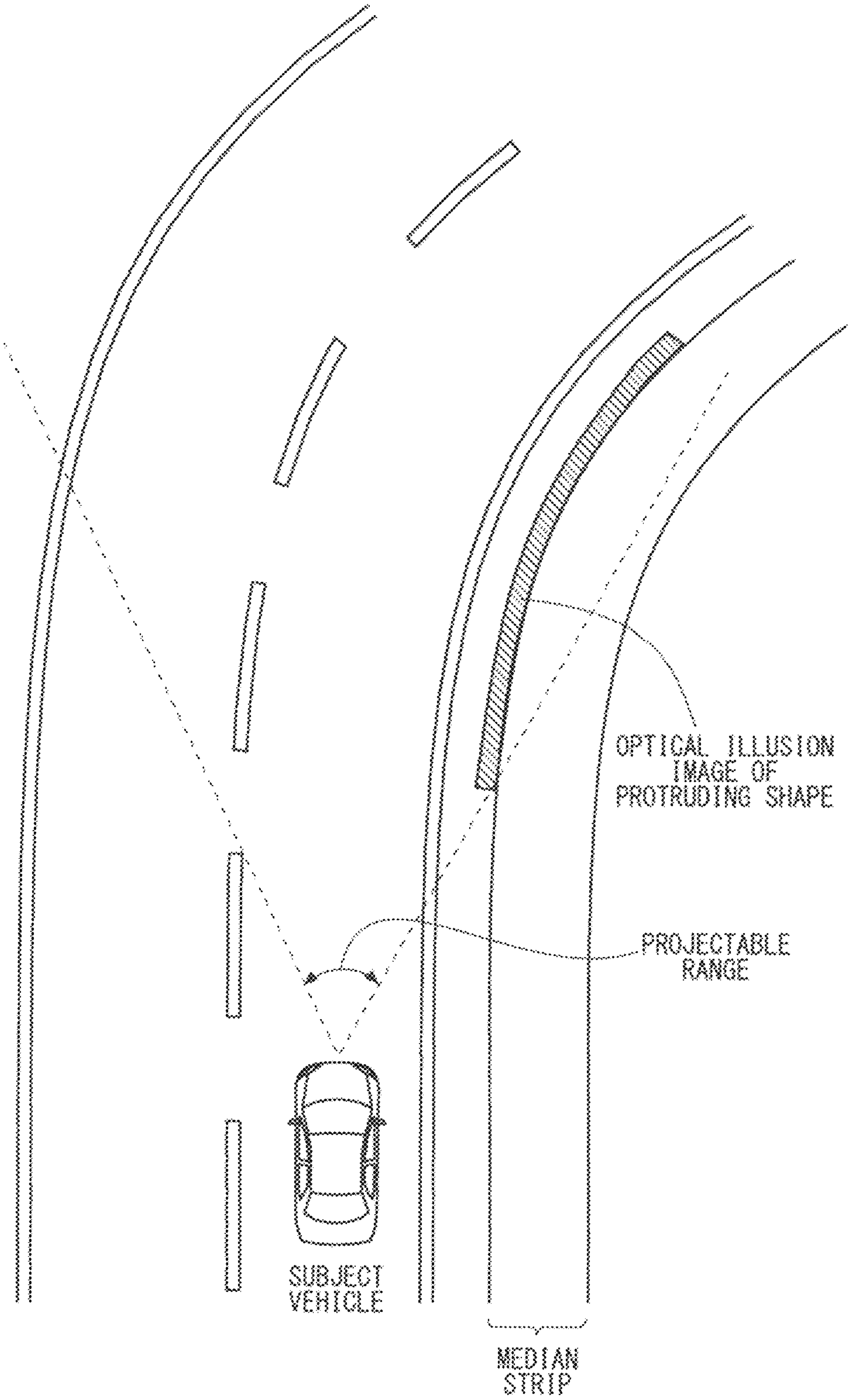
FIG. 5 illustrates an example operation of the projection control system.
Figure 6:
FIG. 6 illustrates example optical illusion images projected ahead of the subject vehicle.

The projection controller 14 controls the projector 22, and causes the projector 22 to project the optical illusion image generated by the optical illusion image generating unit 12 at a position corresponding to the position of the median strip that is an alert target feature. For example, when the projection controller 14 projects the optical illusion image in FIG. 4 at positions along the median strip as illustrated in FIG. 5, objects of a protruding shape appear to be present in front of the median strip, from the driver's seat as illustrated in FIG. 6. This consequently alerts the driver to the median strip. At the same time, the driver can intuitively understand the solid shape of the median strip.

As such, the projection control system according to Embodiment 1 can alert the existence of a caution-required feature while making the driver of the subject vehicle intuitively understand a solid shape of the caution-required feature.

Figure 7:
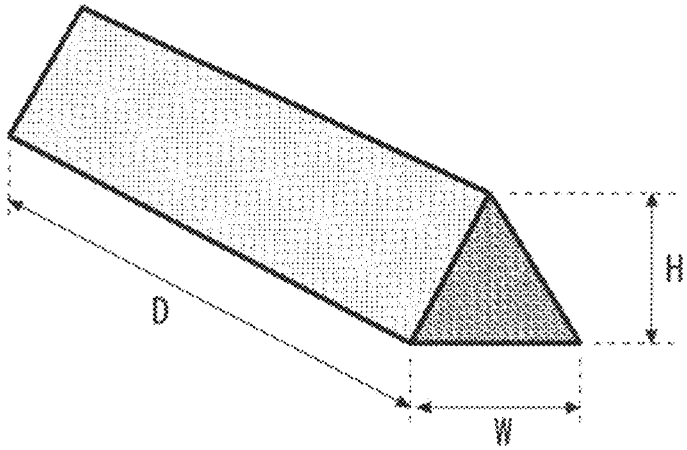
FIG. 7 illustrates an example optical illusion image of a protruding shape.
Figure 8:
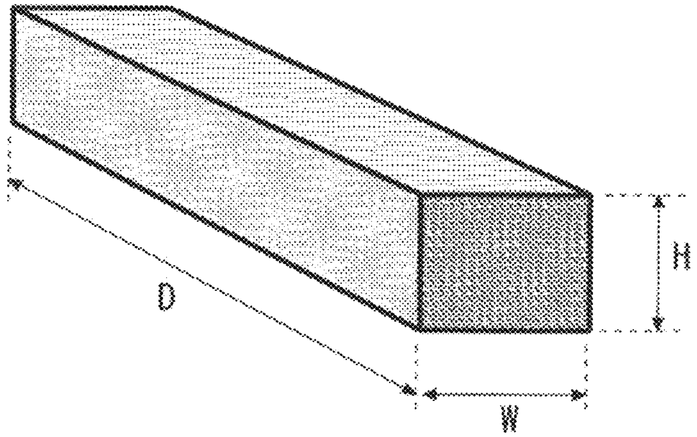
FIG. 8 illustrates an example optical illusion image of a protruding shape.

Although FIGS. 4 and 6 illustrate an image of a trapezoidal column as an example optical illusion image of a protruding shape, the image is not limited to this but may be, for example, an image of a triangle pole as illustrated in FIG. 7 or an image of a rectangular parallelopiped as illustrated in FIG. 8. What kind of an optical illusion image is used may be changed according to a type of an alert target feature. Specifically, a different optical illusion image may be used according to a type of a caution-required feature.

Although FIG. 6 illustrates an example of projecting a plurality of optical illusion images aligned along the median strip, the projector 22 may project one optical illusion image extending long along the median strip. In other words, the optical illusion image may have a continuous shape or a discontinuous shape (a shape split into a plurality of portions). Furthermore, the projector 22 should project the optical illusion image of the median strip between a rightmost lane and the median strip, or at a position distant from the median strip, for example, at a position adjacent to the rightmost lane.

Figure 9:
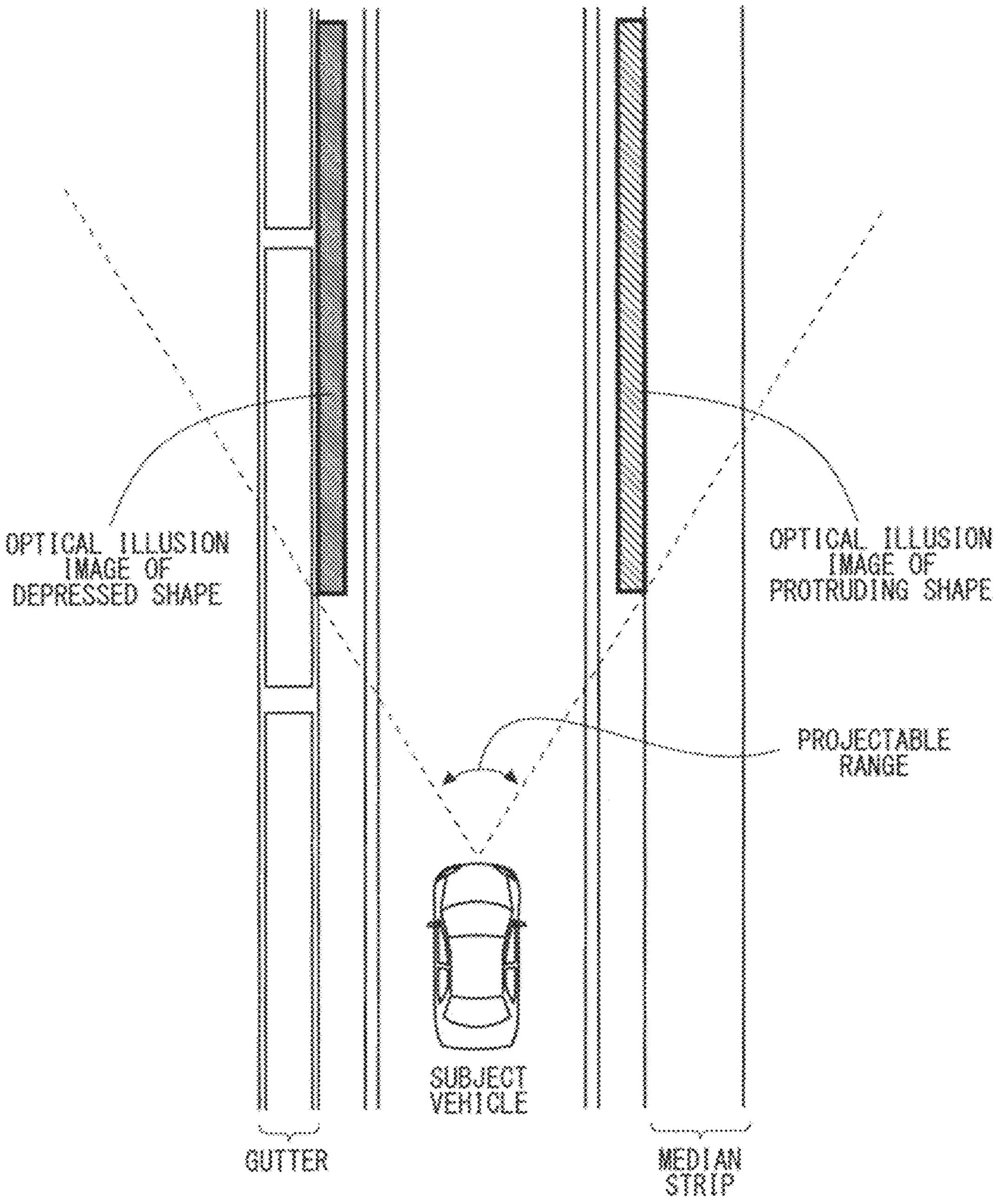
FIG. 9 illustrates an example operation of the projection control system.
Figure 10:
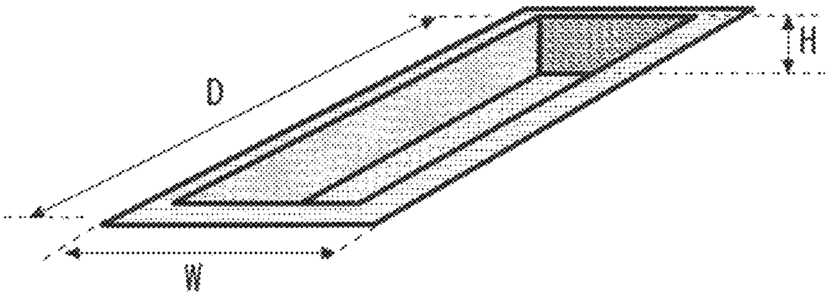
FIG. 10 illustrates an example optical illusion image of a depressed shape.

As described above, the caution-required feature sometimes has a depressed shape, for example, a gutter or a collapsed road surface. For example, when a median strip exists to the right of a road through which the subject vehicle is traveling and a gutter exists to the left of the road as illustrated in FIG. 9, and the median strip and the gutter are determined as caution-required features, the optical illusion image generating unit 12 generates an optical illusion image of a protruding shape as an optical illusion image for alerting the existence of the median strip, and generates an optical illusion image of a depressed shape as an optical illusion image for alerting the existence of the gutter as illustrated in FIG. 10. Then, the projection controller 14 projects the optical illusion image of the protruding shape at a position corresponding to the position of the median strip as illustrated in FIG. 9, and projects the optical illusion image of the depressed shape at a position corresponding to the position of the gutter.

The virtual height (or depth) H of the optical illusion image may be changed according to the height of the caution-required feature. In other words, as a caution-required feature is higher, a value of the virtual height H of the optical illusion image for alerting the caution-required feature may be increased.

Figure 11:
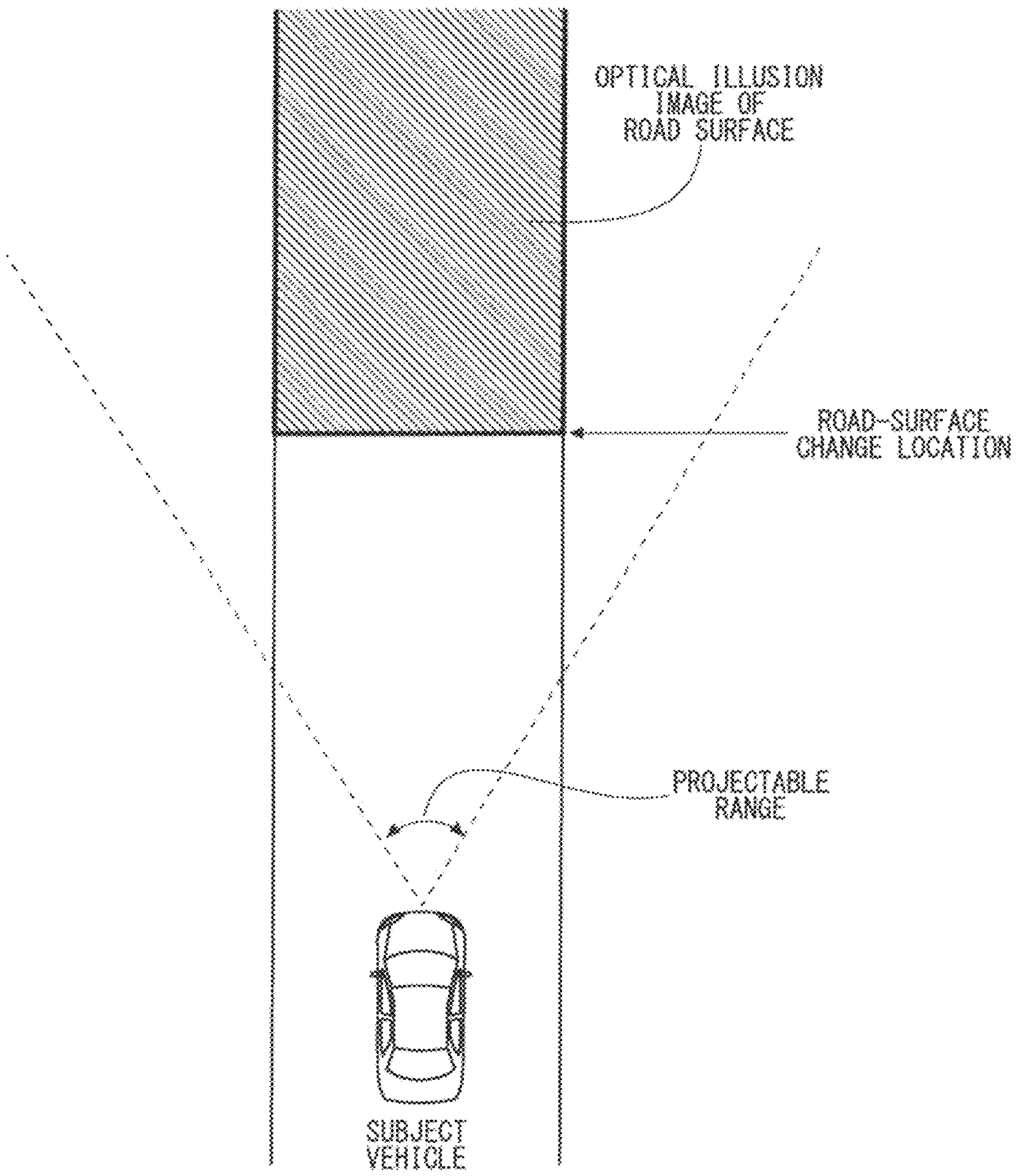
FIG. 11 illustrates an example operation of the projection control system.
Figure 12:
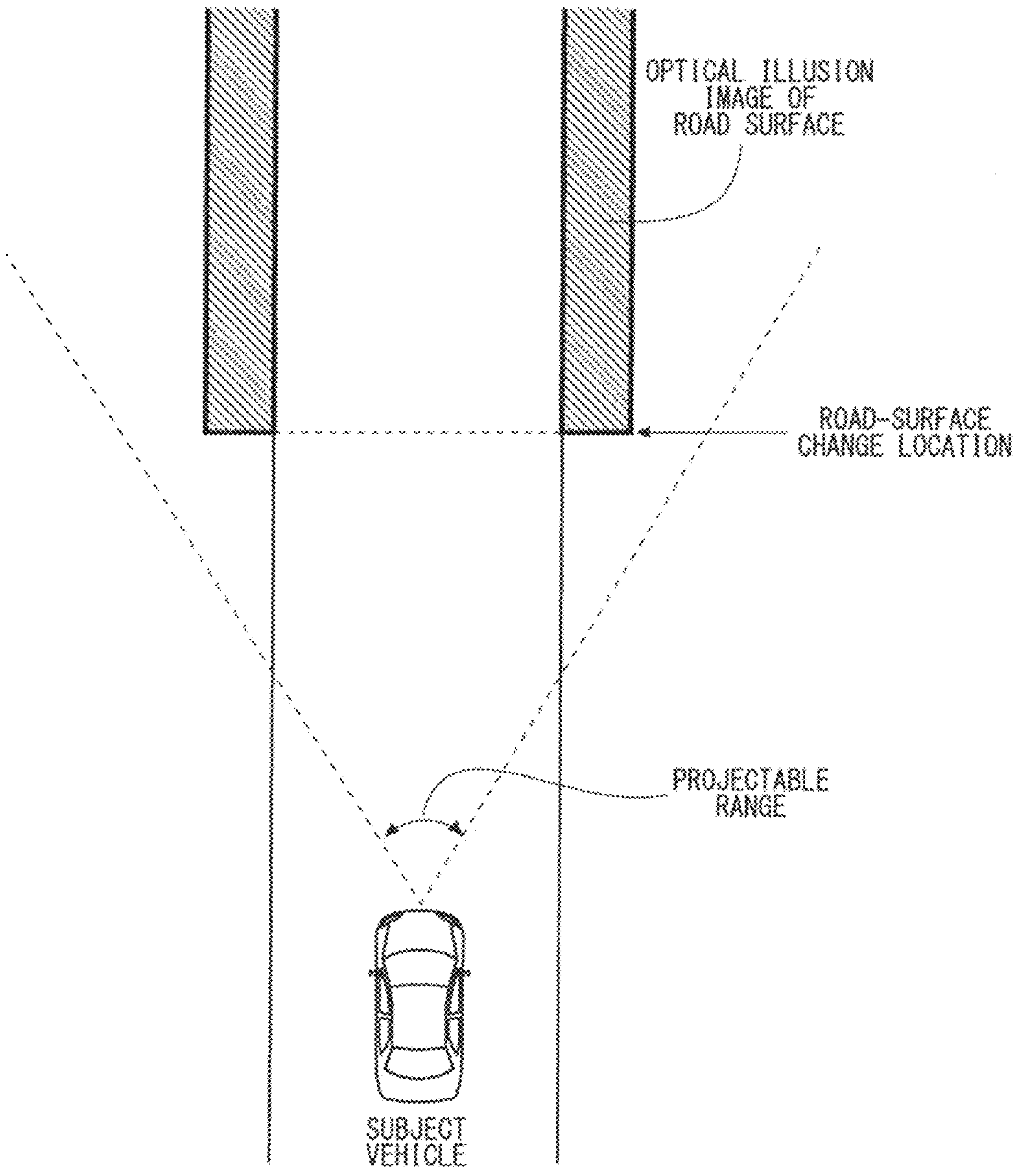
FIG. 12 illustrates an example operation of the projection control system.

As described above, a road surface of a road in a particular state may be a caution-required feature. When a road surface that is a caution-required feature has become an alert target feature, the projector 22 may project an optical illusion image onto the entire road surface of a lane through which the subject vehicle is traveling as illustrated in FIG. 11. However, when the optical illusion image is projected onto the entire road surface of the lane, the driver may have difficulty in visually recognizing the road surface. Thus, the projector 22 may project the optical illusion image of the road surface, for example, outside along the lane through which the subject vehicle is traveling as illustrated in FIG. 12.

Figure 13:
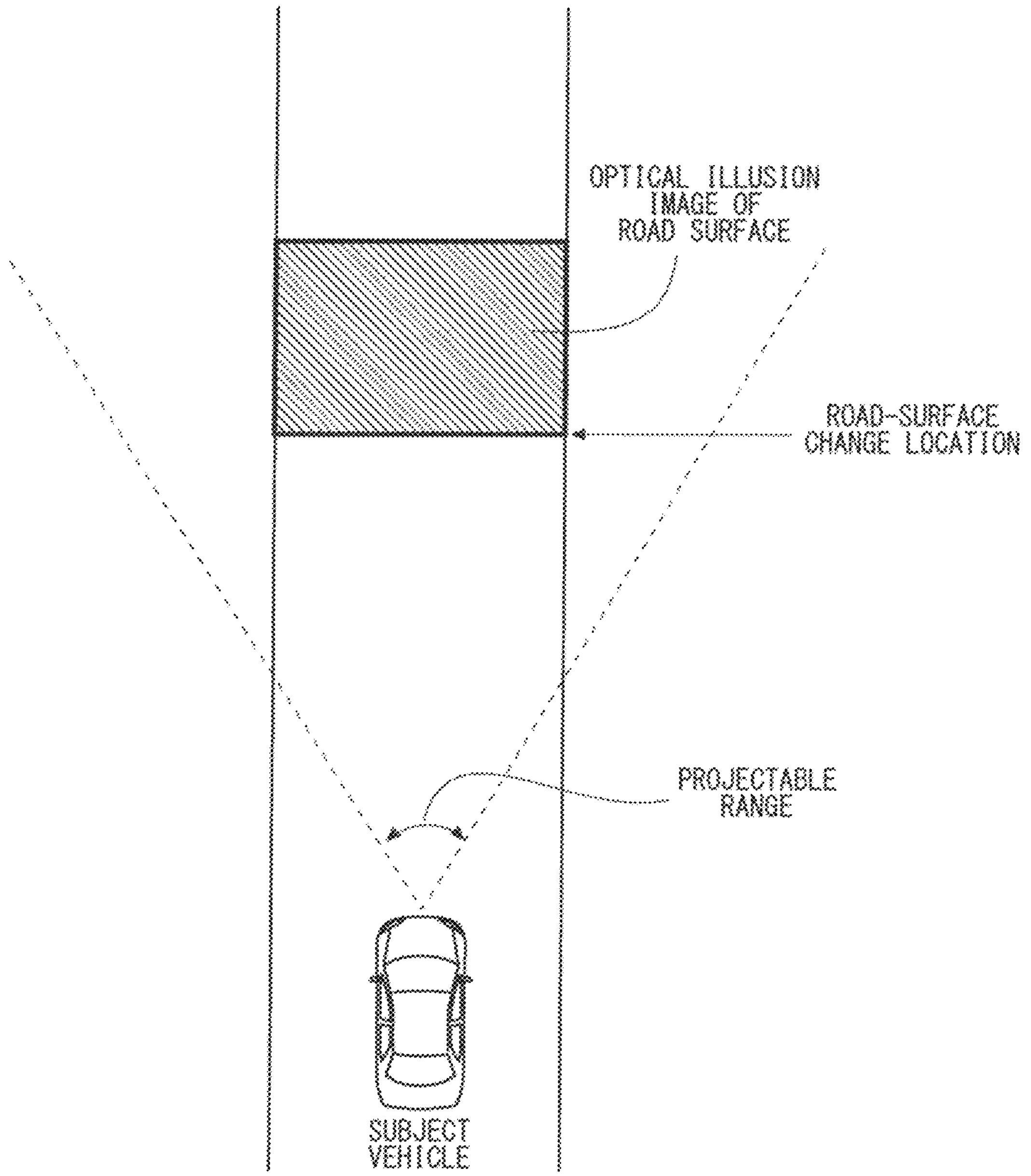
FIG. 13 illustrates an example operation of the projection control system.
Figure 14:
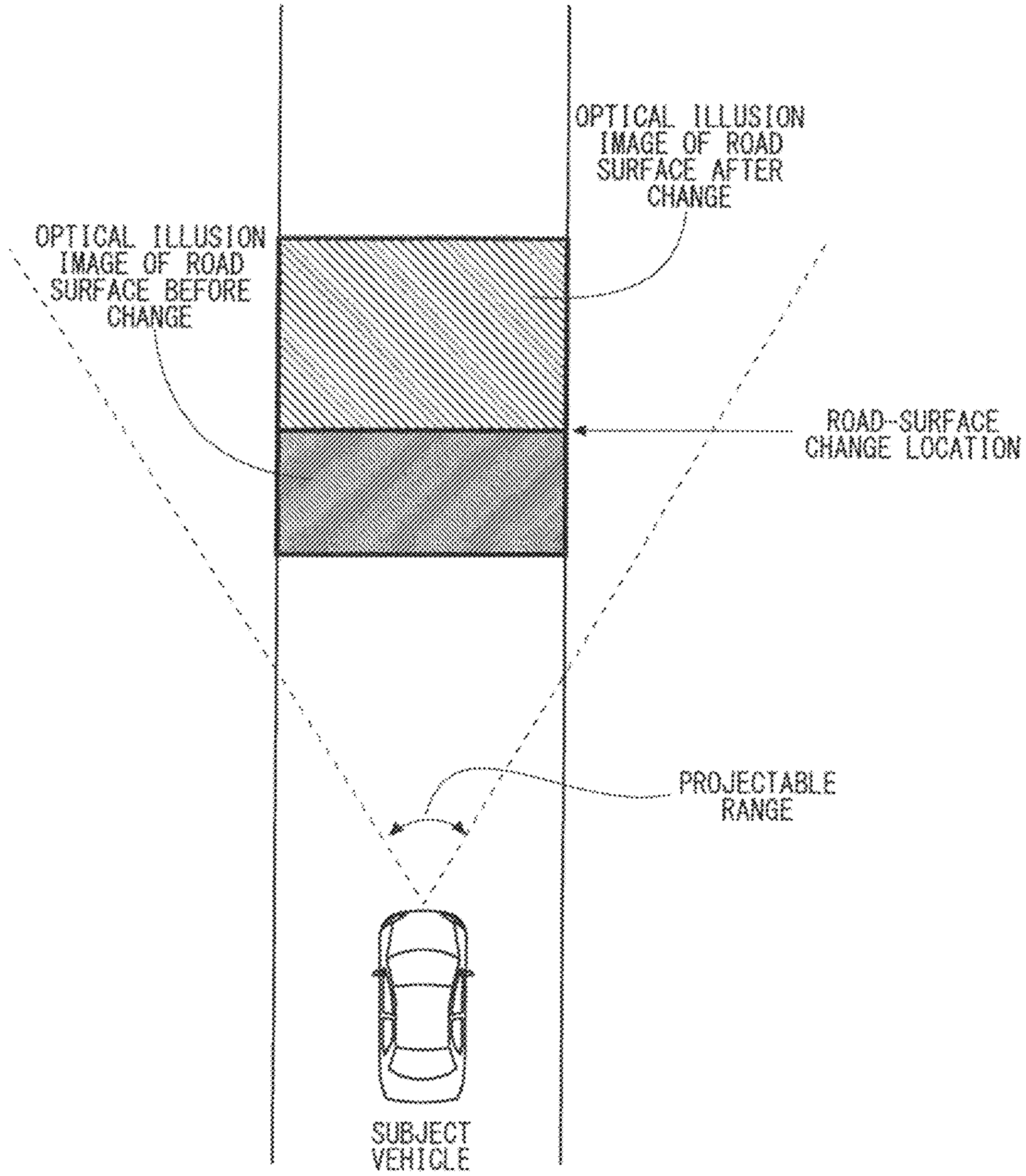
FIG. 14 illustrates an example operation of the projection control system.

Furthermore, after the driver recognizes a state of a road surface, unless the state of the road surface is changed, the necessity of alerting the driver to the state of the road surface is low. Thus, the projector 22 may project the optical illusion image of the road surface, for example, only in a certain range in the vicinity of a road-surface change location as illustrated in FIG. 13 or 14. In other words, the projector 22 may project the optical illusion image of the road surface only when the subject vehicle passes through the vicinity of the road-surface change location. Alternatively, after the subject vehicle passes through the vicinity of the road-surface change location, the usage of projection of an optical illusion image may be reduced by, for example, reducing the lightness of the optical illusion image of the road surface.

When a falling object exists on a road surface, it is preferred to assign a higher priority to making the driver recognize the existence of the falling object than to making the driver recognize a state of a road surface, in view of maintaining the safety. Thus, when the caution-required feature detector 11 detects the falling object on the road surface, it is preferred that the alert determination unit 13 stops projection of an optical illusion image of the road surface, or projects an optical illusion image for alerting the falling object.

Figure 15:
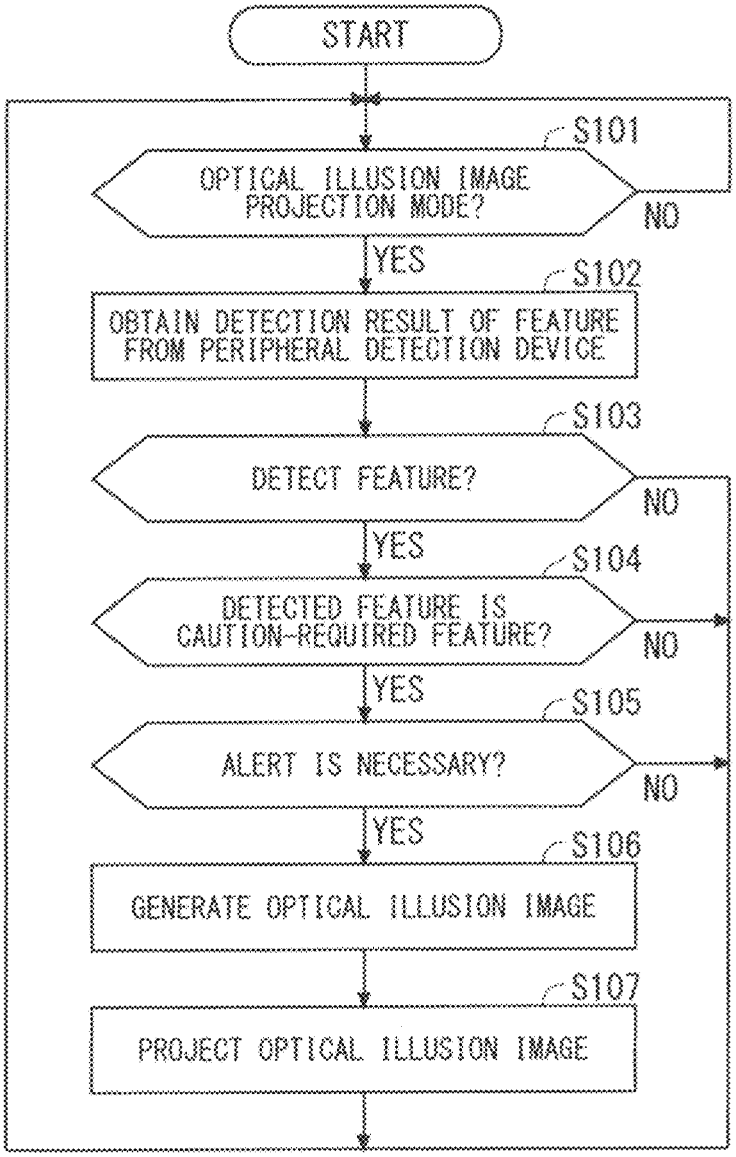
FIG. 15 is a flowchart illustrating operations of a projection control apparatus according to Embodiment 1.

Next, operations of the projection control apparatus 10 will be described with reference to a flowchart in FIG. 15. The projection control apparatus 10 first checks whether its own operation mode is set to an operation mode for issuing an alert using projection of an optical illusion image (an optical illusion image projection mode) (Step S101). When its own operation mode is not set to the optical illusion image projection mode (NO in Step S101), the projection control apparatus 10 waits until the operation mode is set to the optical illusion image projection mode.

When its own operation mode is set to the optical illusion image projection mode (YES in Step S101), the caution-required feature detector 11 obtains a detection result of a feature from the peripheral detection device 21 (Step S102), and checks whether a feature has been detected around the subject vehicle (Step S103). When the feature has been detected around the subject vehicle (YES in Step S103), the caution-required feature detector 11 determines whether the feature is a caution-required feature, based on a shape of the feature (Step S104).

When the feature is a caution-required feature (YES in Step S104), the alert determination unit 13 determines whether alerting the caution-required feature is necessary (Step S105). In other words, the alert determination unit 13 determines whether the caution-required feature is an alert target feature in Step S105.

When the alert determination unit 13 determines the caution-required feature as an alert target feature (YES in Step S105), the optical illusion image generating unit 12 generates an optical illusion image that recalls a solid shape of the alert target feature (Step S106). Then, the projection controller 14 controls the projector 22, and causes the projector 22 to project the optical illusion image generated by the optical illusion image generating unit 12 at a position corresponding to the position of the alert target feature to alert the alert target feature (Step S107). When NO is determined in any one of Steps S103, S104, and S105, processes in Steps S106 and S107 are not performed.

After the aforementioned processes, the processes return to Step S101, In other words, the projection control apparatus 10 repeatedly executes the aforementioned operations.

Here, the operation mode in Step S101 (ON or OFF of the optical illusion image projection mode) may be switched by the user or automatically by the projection control apparatus 10. Examples of a method for the user to switch the operation mode of the projection control apparatus 10 include a method using a hardware key such as a physical switch, and a method using a software key such as a graphical user interface (GUI).

When the projection control apparatus 10 automatically switches the operation mode, for example, when a headlamp or a width indicator (small lamp) of the subject vehicle is lit, the optical illusion image projection mode may be turned ON. Furthermore, when the brightness around the subject vehicle or around an alert target feature is lower than or equal to a certain value, the optical illusion image projection mode may be turned ON. The brightness around the subject vehicle or the alert target feature may be measured by an illuminance sensor of the subject vehicle, or estimated from the lightness of an image captured by a camera functioning as the caution-required feature detector 11.

Furthermore, the projection control apparatus 10 may automatically switch the operation mode, based on a behavior of the subject vehicle. For example, when the caution-required feature detector 11 detects an inferior road surface condition of a road through which the subject vehicle is traveling, and a sensor of the subject vehicle detects behaviors such as a drift and a skid of the subject vehicle, the optical illusion image projection mode may be turned ON.

[Modifications]

When a predefined condition is satisfied, the projection controller 14 may change a display mode of an optical illusion image. For example, when the recognition of the driver on an alert target feature is lower than a predefined threshold or when a rate of a part of an alert target feature that cannot be visually recognized from the subject vehicle is higher than a predefined threshold, the projection controller 14 may highlight an optical illusion image for alerting the alert target feature. Furthermore, as the recognition of the driver on an alert target feature is lower or as a rate of a part of an alert target feature that cannot be visually recognized from the subject vehicle is higher, the projection controller 14 may increase a degree of the highlight. The highlight mode may be any mode, for example, brightness enhancement display, blinking, enlarged display, or animation display.

Furthermore, the optical illusion image generating unit 12 may deform an optical illusion image to be generated, according to various conditions. For example, the optical illusion image generating unit 12 may change an optical illusion image according to a height of the eyepoint of the driver (a height of a position of the seat of the subject vehicle). Specifically, when the eyepoint of the driver is higher, the virtual height H or the virtual depth D of the optical illusion image should be increased. Furthermore, the virtual height H or the virtual depth D of the optical illusion image may be reduced when the traveling speed of the subject vehicle is low, whereas the virtual height H or the virtual depth D of the optical illusion image may be increased when the traveling speed of the subject vehicle is high.

Example Hardware Configuration

Figure 16:
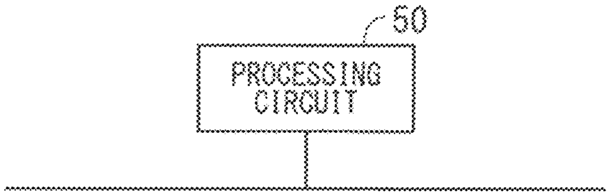
FIG. 16 illustrates an example hardware configuration of the projection control apparatus.
Figure 17:
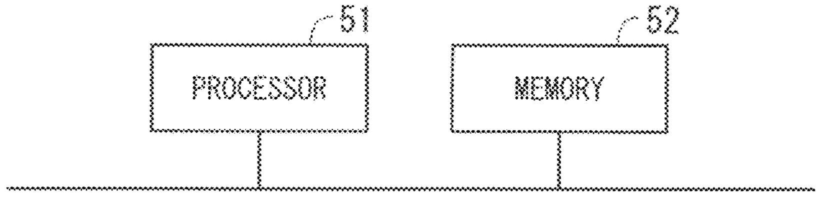
FIG. 17 illustrates an example hardware configuration of the projection control apparatus.

FIGS. 16 and 17 each illustrate an example hardware configuration of the projection control apparatus 10. The functions of the constituent elements of the projection control apparatus 10 illustrated in FIG. 1 are implemented by, for example, a processing circuit 50 illustrated in FIG. 16. Specifically, the projection control apparatus 10 includes the processing circuit 50 for: detecting a caution-required feature that is a feature with a solid shape that impacts on traveling of a subject vehicle; generating an optical illusion image that recalls the solid shape of the caution-required feature; determining whether alerting the caution-required feature is necessary; and causing the projector 22 to project the optical illusion image at a position corresponding to a position of the caution-required feature determined as requiring the alert. This processing circuit 50 may be dedicated hardware, or a processor (also referred to as a central processing unit (CPU), a processing unit, an arithmetic unit, a microprocessor, a microcomputer, or a digital signal processor (DSP)) that executes a program stored in a memory.

When the processing circuit 50 is dedicated hardware, the processing circuit 50 is, for example, a single circuit, a composite circuit, a programmed processor, a parallel-programmed processor, an application-specific integrated circuit (ASIC), a field-programmable gate array (FPGA), or any combination of these. Functions of the constituent elements of the projection control apparatus 10 may be implemented by separate processing circuits, or collectively implemented by a single processing circuit.

FIG. 17 illustrates an example hardware configuration of the projection control apparatus 10 when the processing circuit 50 includes a processor 51 that executes a program. Here, the functions of the constituent elements of the projection control apparatus are implemented by, for example, software (software, firmware, or a combination of the software and the firmware). For example, the software is described as a program, and stored in a memory 52. The processor 51 performs the functions of each of the elements by reading and executing the programs stored in the memory 52. Specifically, the projection control apparatus 10 includes the memory 52 for storing a program which, when executed by the processor 51, consequently executes the processes of: detecting a caution-required feature that is a feature with a solid shape that impacts on traveling of a subject vehicle; generating an optical illusion image that recalls the solid shape of the caution-required feature; determining whether alerting the caution-required feature is necessary; and causing the projector 22 to project the optical illusion image at a position corresponding to a position of the caution-required feature determined as requiring the alert. Put it differently, this program causes a computer to execute procedures or methods of operations of the constituent elements of the projection control apparatus 10.

Here, examples of the memory 52 may include non-volatile or volatile semiconductor memories such as a random-access memory (RAM), a read-only memory (ROM), a flash memory, an erasable programmable read-only memory (EPROM), and an electrically erasable programmable read-only memory (EEPROM), a hard disk drive (HDD), a magnetic disc, a flexible disk, an optical disk, a compact disk, a mini disk, a Digital Versatile Disc (DVD), a drive device thereof, and further any a storage medium to be used in the future.

What is described above is the configuration for implementing the functions of the constituent elements of the projection control apparatus 10 using one of the hardware and the software, etc. However, the configuration is not limited to this. A part of the constituent elements of the projection control apparatus 10 may be implemented by dedicated hardware, and another part of the constituent elements may be implemented by software, etc. For example, the processing circuit 50 functioning as the dedicated hardware can implement the functions of the part of the constituent elements, and the processing circuit 50 functioning as the processor 51 can implement the functions of the other part of the constituent elements through reading and executing a program stored in the memory 52.

As described above, the projection control apparatus 10 can implement each of the functions by hardware, software, etc., or any combinations of these.

Embodiment 2

Figure 18:
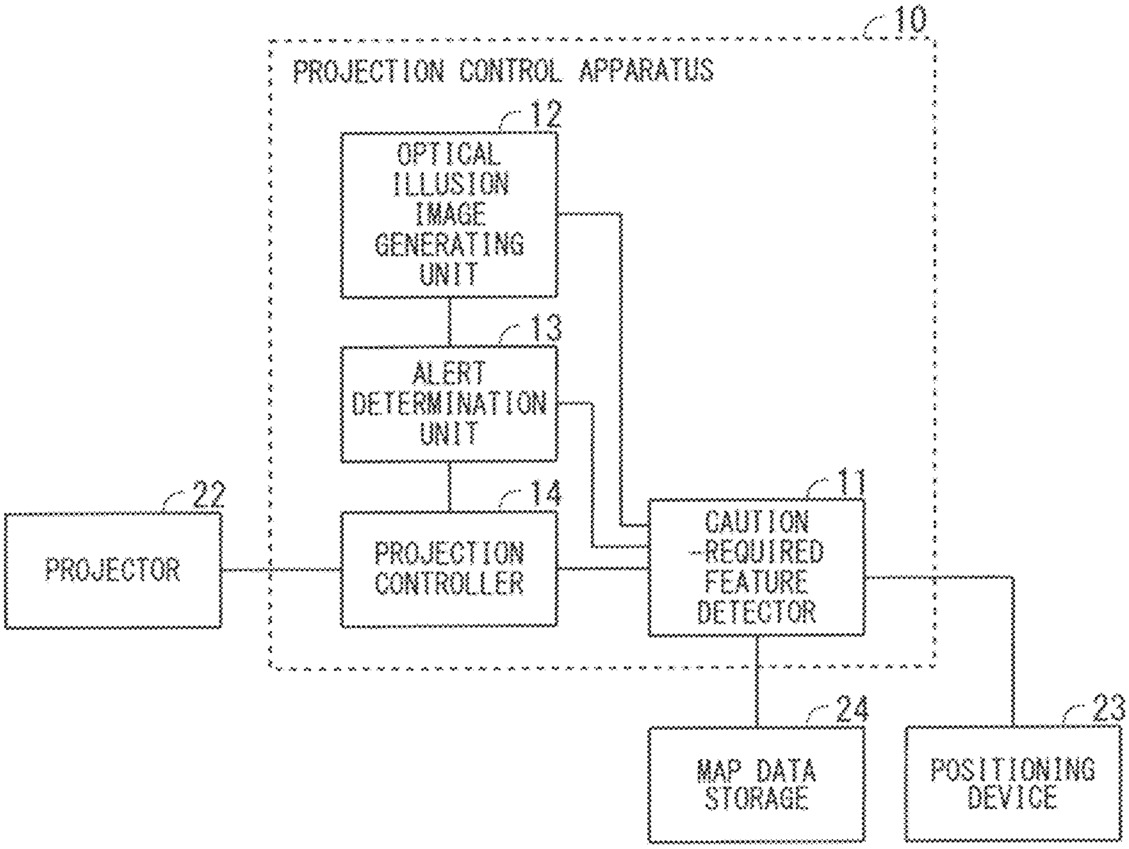
FIG. 18 illustrates a configuration of a projection control system according to Embodiment 2.

FIG. 18 illustrates a configuration of a projection control system according to Embodiment 2. The configuration of the projection control system in FIG. 18 is obtained by adding a positioning device 23 and a map data storage 24 to the configuration of FIG. 1 according to Embodiment 1, as a replacement for the peripheral detection device 21.

The positioning device 23 calculates a position and a traveling direction of the subject vehicle, based on positioning signals obtained from the global navigation satellite system (GNSS) and information obtained from sensors (for example, a speed sensor, an acceleration sensor, and an azimuth sensor) of the subject vehicle. The positioning device 23 can identify the position of the subject vehicle with accuracy high enough to identify a lane through which the subject vehicle is traveling, specifically, on the order of several tens of centimeters.

The map data storage 24 is a storage medium in which map data is stored. The map data includes information on positions and shapes of lanes of roads, and positions and shapes (including solid shapes) of features around the roads. The map data stored in the map data storage 24 is high-definition map data in which the positions and the shapes of the lanes and the features are described with accuracy on the order of several tens of centimeters. The map data stored in the map data storage 24 may be used for a map matching process for correcting the position of the subject vehicle which has been calculated by the positioning device 23.

The basic configuration and operations of the projection control apparatus 10 according to Embodiment 2 are identical to those according to Embodiment 1. However, the caution-required feature detector 11 according to Embodiment 2 detects a caution-required feature around the subject vehicle, based on information on the position of the subject vehicle which has been calculated by the positioning device 23, and information on positions and solid shapes of features around the subject vehicle which is included in the map data stored in the map data storage 24.

Figure 19:
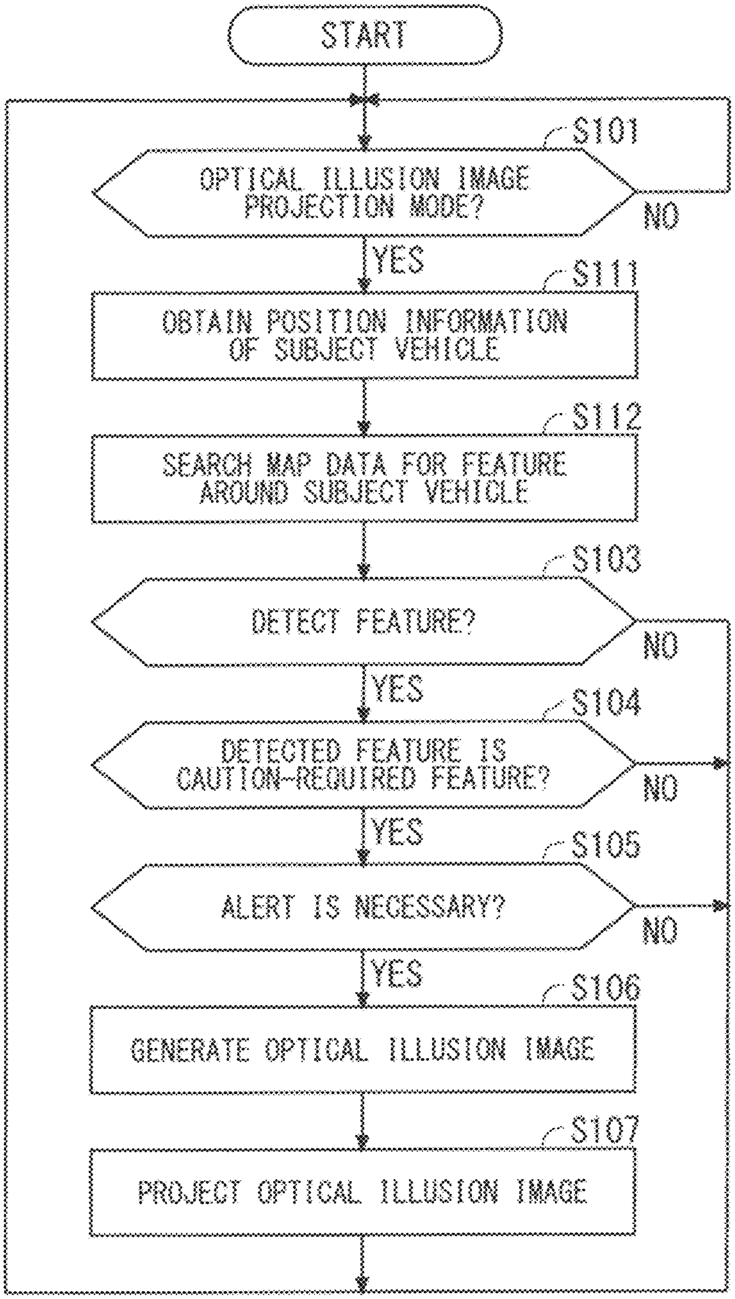
FIG. 19 is a flowchart illustrating operations of a projection control apparatus according to Embodiment 2.

FIG. 19 is a flowchart illustrating operations of the projection control apparatus according to Embodiment 2. The flowchart of FIG. 19 is obtained by replacing Step S102 in the flowchart of FIG. 15 according to Embodiment 1 with Steps S111 and S112 below.

In Step S111, the caution-required feature detector 11 obtains position information of the subject vehicle from the positioning device 23. In Step S112, the caution-required feature detector 11 searches the map data stored in the map data storage 24 for a feature around the subject vehicle.

When the caution-required feature detector 11 detects the feature around the subject vehicle in Step S112 (YES in Step S103), the caution-required feature detector 11 determines whether the feature is a caution-required feature, based on the information on a shape of the feature included in the map data (Step S104).

Since the processes of the other steps are basically the same as those described with reference to FIG. 15, the description herein is omitted.

[Modifications]

Although FIG. 18 illustrates an example of the projection control system excluding the peripheral detection device 21, the projection control system according to Embodiment 2 may include the peripheral detection device 21. When the projection control system does not include the peripheral detection device 21, the projection control system cannot check, for example, whether a caution-required feature cannot be seen by accumulated snow or mud. Thus, the projection control system has limitations in feasible functions more than those according to Embodiment 1. However, inclusion of the peripheral detection device 21 in the projection control system according to Embodiment 2 can implement the functions equivalent to those of Embodiment 1.

Inclusion of the peripheral detection device 21 in the projection control system according to Embodiment 2 further enables the peripheral detection device 21 to detect a dividing line of a lane. The projection control system can correct the position of the subject vehicle which has been calculated by the positioning device 23, based on the detected dividing line of the lane, and improve the accuracy of calculating the position of the subject vehicle.

Embodiment 3

Figure 20:
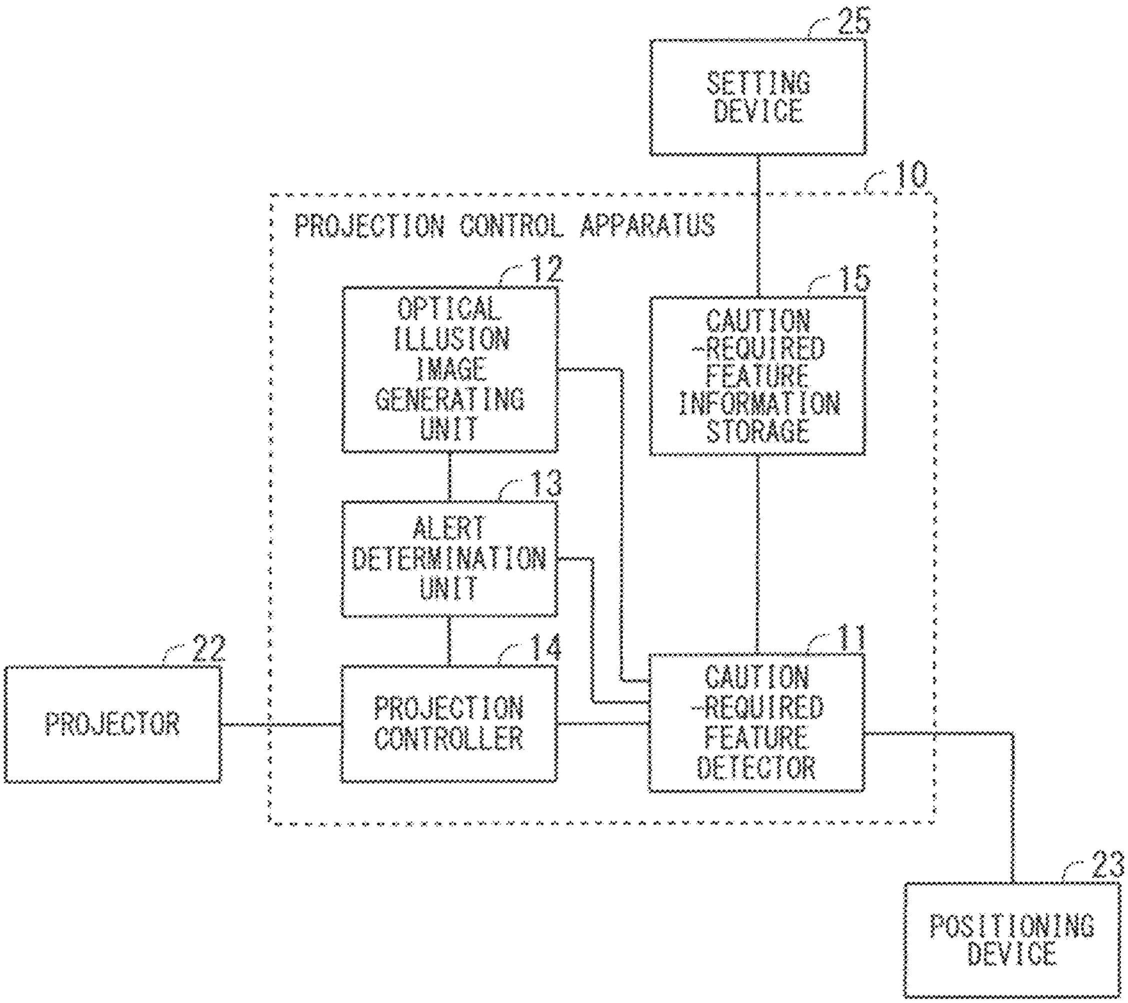
FIG. 20 illustrates a configuration of a projection control system according to Embodiment 3.

FIG. 20 illustrates a configuration of a projection control system according to Embodiment 3. The configuration of the projection control system in FIG. 20 is obtained by including a setting device 25 in the configuration of FIG. 18 according to Embodiment 2 as a replacement for the map data storage 24, and adding a caution-required feature information storage 15 in the projection control apparatus 10.

The caution-required feature information storage 15 stores caution-required feature information including position information on a caution-required feature. The caution-required feature information may include not only the position information on the caution-required feature but also information on the type and the shape of the caution-required feature. Storing information on the caution-required feature in the caution-required feature information storage 15 means "registering" the information.

The setting device 25 is a device that registers a caution-required feature in the caution-required feature information storage 15. Specifically, the caution-required feature information storage 15 obtains the caution-required feature information from the setting device 25, and stores the caution-required feature information. The setting device 25 is a user device of the projection control apparatus 10, such as a mobile device or a smart phone, or a device of an infrastructure (an infrastructure device) such as a security camera. The setting device 25 may be any device that can be authenticated by the projection control apparatus 10.

There is no constraint on methods for the setting device 25 to obtain the caution-required feature information and register the caution-required feature information in the caution-required feature information storage 15. For example, when the setting device 25 is a user device, the setting device 25 may extract and obtain the caution-required feature information from a map data storage that is not illustrated, according to an operation of the user, and register the obtained information in the caution-required feature information storage 15. The setting device 25 may include a human-machine interface (HMI) that can select a region or a type of a caution-required feature on which the setting device 25 obtains information.

Furthermore, the setting device 25 may download the caution-required feature information from an external server with a database of caution-required features, according to an operation of the user, and register the obtained information in the caution-required feature information storage 15. The setting device 25 may include the HMI that can select a region or a type of a caution-required feature to be downloaded. Furthermore, the setting device 25 may have functions of detecting an update of the database, automatically downloading the latest caution-required feature information, and updating information registered in the caution-required feature information storage 15. Furthermore, the setting device 25 may automatically download information on a caution-required feature occurring due to, for example, the impact of weather, and register the information as information on a temporary caution-required feature in the caution-required feature information storage 15.

Furthermore, the user may be allowed to operate the setting device 25 and register original information on a caution-required feature in the caution-required feature information storage 15. For example, when the user transmits, to the projection control apparatus 10, an image of a feature captured by a smart phone that is the setting device 25, and the projection control apparatus 10 analyzes the image and determines the feature as a caution-required feature, the feature may be registered as a caution-required feature in the caution-required feature information storage 15.

When the setting device 25 is an infrastructure device such as a security camera, the projection control apparatus 10 obtains information on a feature determined by the infrastructure device as a caution-required feature, and registers the feature in the caution-required feature information storage 15.

The basic configuration and operations of the projection control apparatus 10 according to Embodiment 3 are identical to those according to Embodiment 1. The caution-required feature detector 11 according to Embodiment 3 detects a caution-required feature around the subject vehicle, based on information on the position of the subject vehicle which has been calculated by the positioning device 23 and the caution-required feature information stored in the caution-required feature information storage 15.

Figure 21:
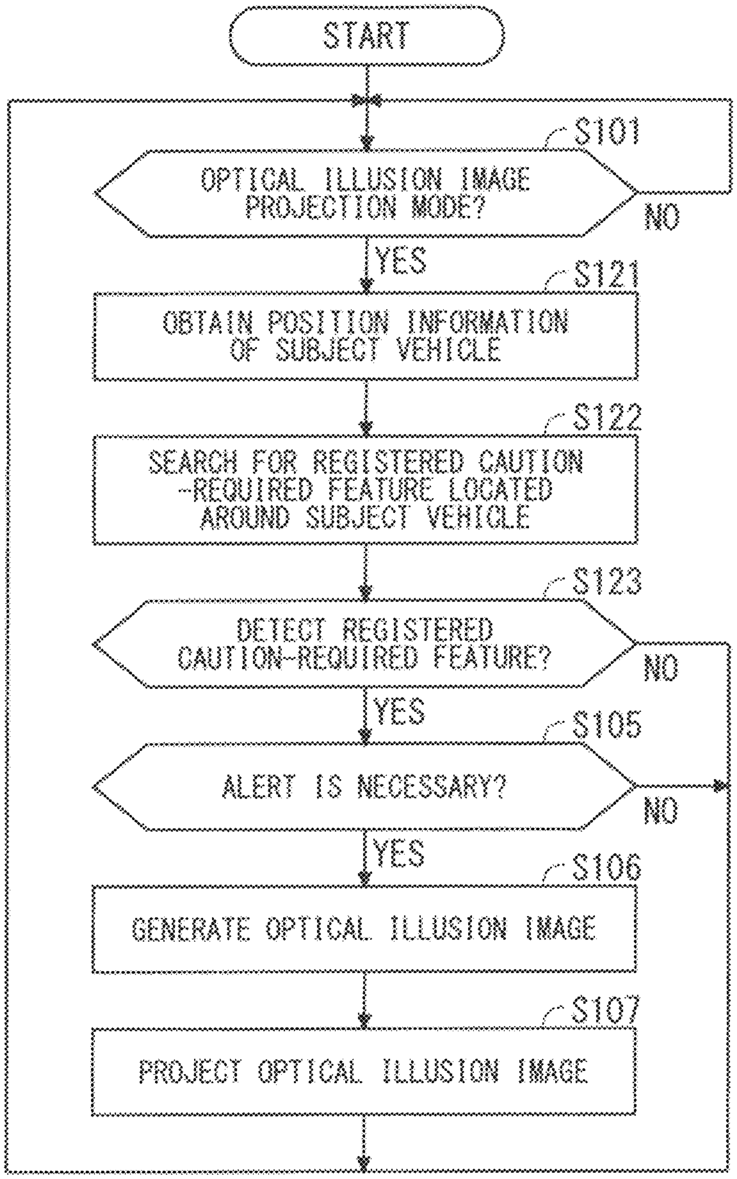
FIG. 21 is a flowchart illustrating operations of a projection control apparatus according to Embodiment 3.

FIG. 21 is a flowchart illustrating operations of the projection control apparatus according to Embodiment 3. The flowchart of FIG. 21 is obtained by replacing Steps S102 to S104 in the flowchart of FIG. 15 according to Embodiment 1 with Steps S121 to S123 below.

In Step S121, the caution-required feature detector 11 obtains position information of the subject vehicle from the positioning device 23. In Step S122, the caution-required feature detector 11 searches for a registered caution-required feature located around the subject vehicle, based on the position information of the subject vehicle and the caution-required feature information stored in the caution-required feature information storage 15.

When the caution-required feature detector 11 detects the registered caution-required feature located around the subject vehicle in Step S122 (YES in Step S123), the processes proceed to Step S105. In Step S105, the alert determination unit 13 determines whether alerting the caution-required feature is necessary. When the caution-required feature detector 11 does not detect the registered caution-required feature located around the subject vehicle in Step S122 (NO in Step S123), the processes return to Step S101. Since the processes of the other steps are basically the same as those described with reference to FIG. 15, the description herein is omitted.

[Modifications]

Figure 22:
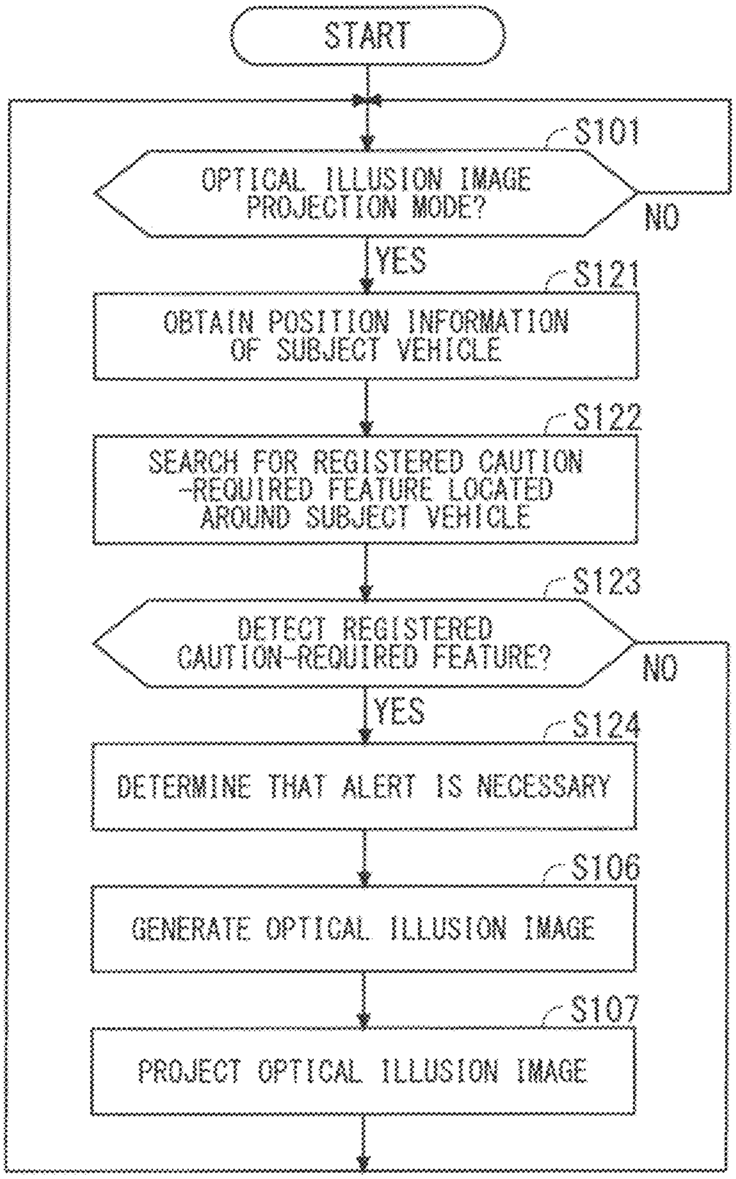
FIG. 22 is a flowchart illustrating a modification of the projection control apparatus according to Embodiment 3.

The alert determination unit 13 may unconditionally determine the caution-required feature registered in the caution-required feature information storage 15 as an alert target feature. A flowchart of FIG. 22 illustrates operations of the projection control apparatus in such a case. The flowchart of FIG. 22 is obtained by replacing Step S105 in the flowchart of FIG. 21 with Step S124. In Step S124, the alert determination unit 13 unconditionally determines the caution-required feature determined as YES in Step S123 (i.e., the registered caution-required feature) as an alert target feature. In this modification, the alert determination unit 13 always determines the caution-required feature registered in the caution-required feature information storage 15 as an alert target feature. In other words, the caution-required feature information storage 15 is used as a means for registering an alert target feature.

Although FIG. 20 illustrates the projection control system excluding the map data storage 24, the projection control system according to Embodiment 3 may also include the map data storage 24. For example, only position information on a caution-required feature may be registered in the caution-required feature information storage 15. The caution-required feature detector 11 may obtain information on, for example, a type and a shape of the registered caution-required feature from the map data storage 24 as necessary.

Embodiment 4

Figure 23:
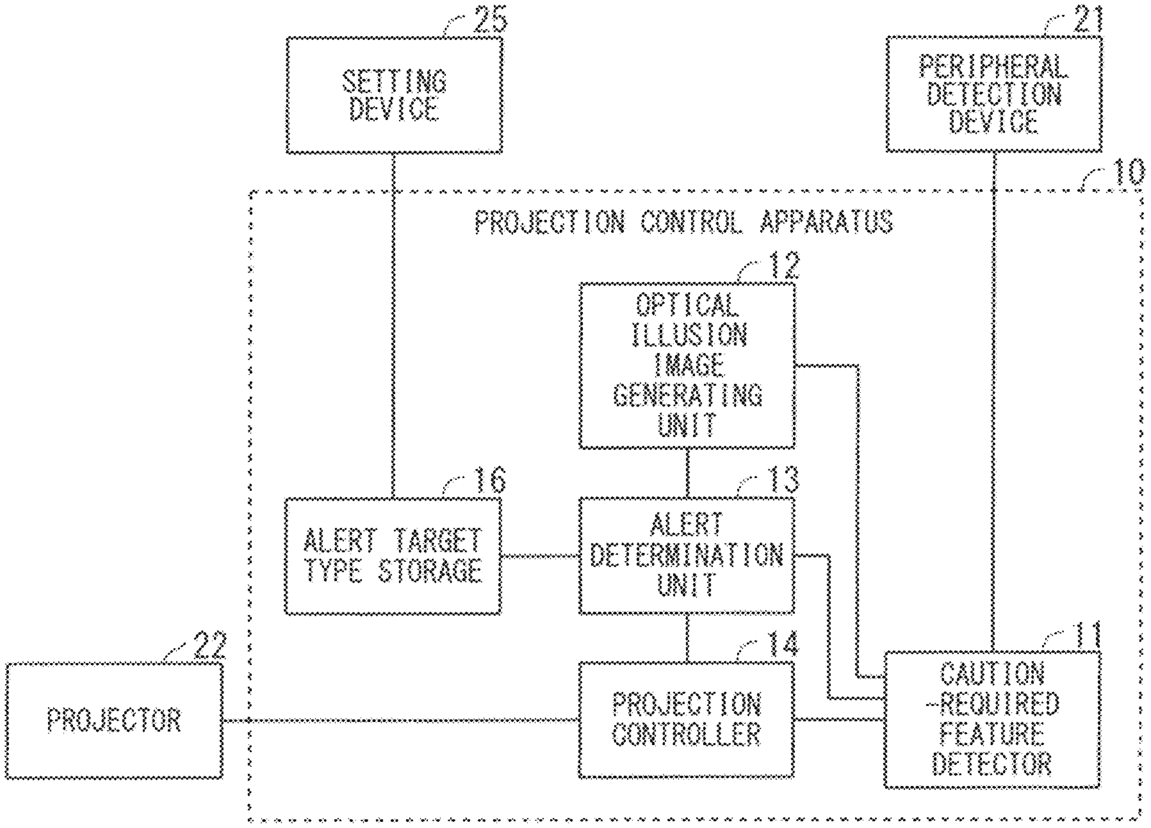
FIG. 23 illustrates a configuration of a projection control system according to Embodiment 4.

FIG. 23 illustrates a configuration of a projection control system according to Embodiment 4. The configuration of the projection control system in FIG. 23 is obtained by adding the setting device 25 to the configuration in FIG. 1 according to Embodiment 1 and adding an alert target type storage 16 in the projection control apparatus 10.

The alert target type storage 16 stores information on an alert target type that is a type of a feature to be alerted. Storing information on an alert target type in the alert target type storage 16 means "registering" the information.

The alert determination unit 13 determines only a caution-required feature of the alert target type registered in the alert target type storage 16 as an alert target. Conversely speaking, the alert determination unit 13 excludes a caution-required feature of a non-alert target type from alert targets.

The setting device 25 is a device that registers an alert target type in the alert target type storage 16. Specifically, the alert target type storage 16 obtains information on an alert target type from the setting device 25, and stores the information. The setting device is a user device of the projection control apparatus 10, such as a mobile device or a smart phone, or an infrastructure device such as a security camera. The setting device 25 may be any device that can be authenticated by the projection control apparatus 10.

There is no constraint on methods for the setting device 25 to obtain information on an alert target type and register the information in the alert target type storage 16. For example, when the setting device 25 is a user device, the user may operate the setting device to select which type of a caution-required feature is desirably alerted. Then, the setting device 25 may register the type selected by the user in the alert target type storage 16. For example, a road shoulder, a median strip, a gutter, a road-surface condition change location, or an obstacle is probably selected as an alert target type.

When the setting device 25 is an infrastructure device such as a security camera, the projection control apparatus 10 obtains information on a type of a feature determined by the infrastructure device as an alert target feature, and registers the information in the alert target type storage 16.

The basic configuration and operations of the projection control apparatus 10 according to Embodiment 4 are identical to those according to Embodiment 1. The alert determination unit 13 determines only a caution-required feature of the alert target type registered in the alert target type storage 16 as an alert target as described above.

Figure 24:
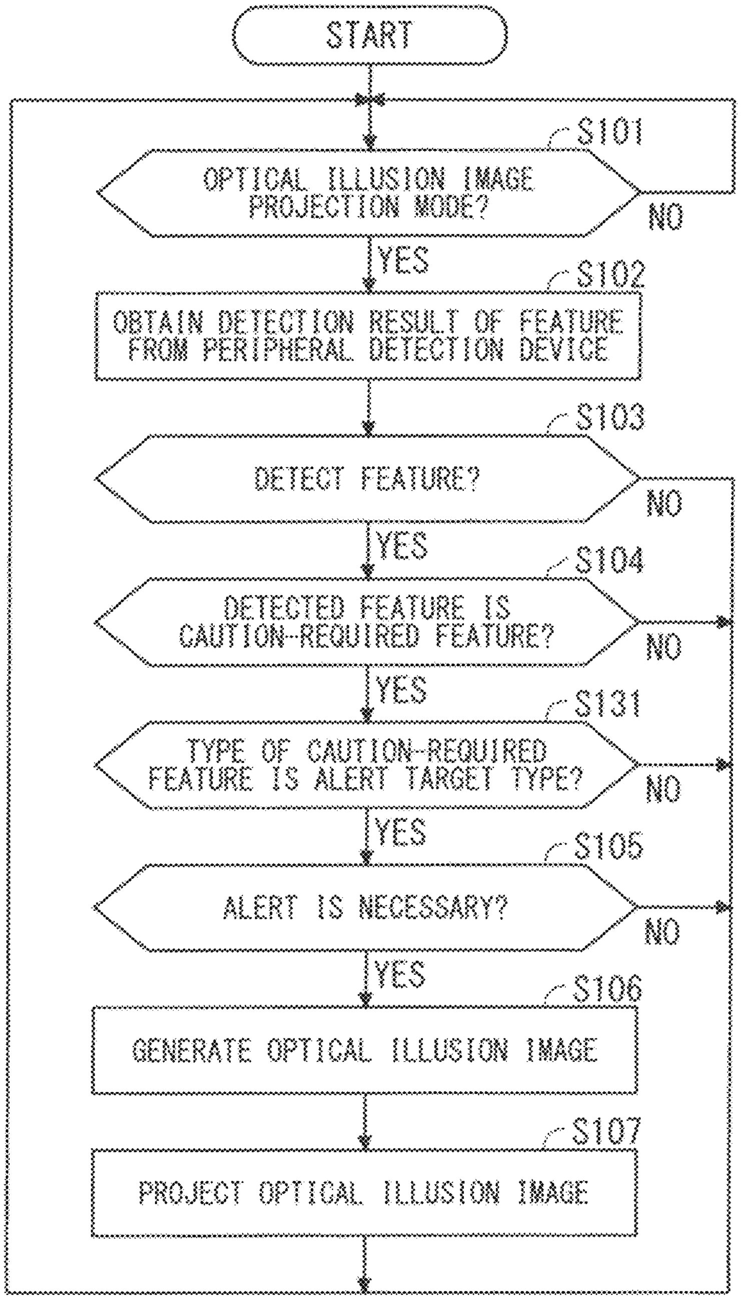
FIG. 24 is a flowchart illustrating operations of a projection control apparatus according to Embodiment 4.

FIG. 24 is a flowchart illustrating operations of the projection control apparatus according to Embodiment 4. The flowchart of FIG. 24 is obtained by adding Step S131 between Step S104 and Step S105 in the flowchart of FIG. 15 according to Embodiment 1.

Step S131 is executed when the caution-required feature detector 11 detects a caution-required feature (when YES is determined in Step S104). In Step S131, the alert determination unit 13 checks whether a type of the caution-required feature is an alert target type. When the type of the caution-required feature is an alert target type (YES in Step S131), the processes proceed to Step S105. When the type of the caution-required feature is not an alert target type (NO in Step S131), the processes return to Step S101. Since the processes of the other steps are basically the same as those described with reference to FIG. 15, the description herein is omitted.

[Modifications]

FIG. 23 illustrates an example of including the alert target type storage 16 in the projection control system according to Embodiment 1. Embodiment 4 is applicable to the projection control systems according to Embodiments 2 and 3.

For example, when the alert target type storage 16 is applied to the projection control system according to Embodiment 3, the projection control apparatus 10 includes both of the caution-required feature information storage 15 and the alert target type storage 16. Here, the alert determination unit 13 may determine both of a caution-required feature registered in the caution-required feature information storage 15 and a caution-required feature of a type registered in the alert target type storage 16 as alert target features.

Embodiments can be freely combined, or appropriately modified and omitted.

The foregoing description is in all aspects illustrative, and numerous modifications and variations that have not yet been exemplified can be devised.

EXPLANATION OF REFERENCE SIGNS

10 projection control apparatus, 11 caution-required feature detector, 12 optical illusion image generating unit, 13 alert determination unit, 14 projection controller, 15 caution-required feature information storage, 16 alert target type storage, 21 peripheral detection device, 22 projector, 23 positioning device, 24 map data storage, 25 setting device.

The invention claimed is:

1. A projection control apparatus, comprising:

a processing circuit configured to:

detect a caution-required feature that is a feature with a solid shape that impacts on traveling of a subject vehicle, the feature including a structure on a road, a road surface in a particular state, or an object not installed on a road;

generate an optical illusion image having a different shape than the solid shape of the caution-required feature, the generated optical illusion image being an image to be perceived as if a feature existed through optical illusion when viewed from the driver of the subject vehicle;

determine whether alerting the caution-required feature is necessary; and cause a projector to project the optical illusion image at a position corresponding to a position of the caution-required feature determined as requiring the alert, wherein the processing circuit is configured to generate the optical illusion image as a protruding shape when the caution-required feature has a shape protruding from a road surface, and to generate the optical illusion image as a depressed shape when the caution-required feature has a shape depressed from a road surface, and wherein the optical illusion image is generated by perspective rendering computed from an eyepoint of the driver of the subject vehicle so that the generated optical illusion image projected on a road surface appears to the driver as a solid three-dimensional feature existing on the road surface.

2. The projection control apparatus according to claim 1, wherein the projector projects the optical illusion image onto a road surface.

3. The projection control apparatus according to claim 1, wherein the processing circuit is further configured to determine that alerting the caution-required feature whose distance from the subject vehicle is smaller than or equal to a predefined threshold is necessary.

4. The projection control apparatus according to claim 1, wherein the processing circuit is further configured to change the optical illusion image according to a type of the caution-required feature.

5. The projection control apparatus according to claim 1, wherein the processing circuit is configured to highlight the optical illusion image when recognition of a driver on the caution-required feature determined as requiring the alert is lower than a predefined threshold or when a rate of a part of the caution-required feature that has been determined as requiring the alert and cannot be visually recognized from the subject vehicle is higher than a predefined threshold.

6. The projection control apparatus according to claim 1, wherein the processing circuit is configured to detect the caution-required feature based on position information of the subject vehicle and map data.

7. The projection control apparatus according to claim 1, further comprising a caution-required feature information storage to obtain caution-required feature information from an infrastructure or a user device and store the caution-required feature information, the caution-required feature information including position information of the caution-required feature, wherein the caution-required feature detector detects the caution-required feature, based on position information of the subject vehicle and the caution-required feature information.

8. The projection control apparatus according to claim 7, wherein the processing circuit is configured to determine that alerting the caution-required feature registered in the caution-required feature information storage is necessary.

9. The projection control apparatus according to claim 1, further comprising:

an alert target type storage to obtain information on a type of a feature to be alerted from an infrastructure or a user device and store the information, wherein the processing circuit is configured to determine only the caution-required feature of the type registered in the alert target type storage as an alert target.

10. The projection control apparatus according to claim 1, wherein the processing circuit is configured to determine that alerting the caution-required feature whose part or entirety is hidden by a visual obstruction and cannot be seen is necessary.

11. The projection control apparatus according to claim 1, wherein the processing circuit is configured to determine whether alerting the caution-required feature is necessary, based on whether a weather condition around the subject vehicle is a weather condition causing low visibility.

12. The projection control apparatus according to claim 1, wherein the processing circuit is configured to determine whether alerting the caution-required feature is necessary, based on recognition of a driver on the caution-required feature which is determined by a driver sensing device of the subject vehicle.

13. The projection control apparatus according to claim 12, wherein the processing circuit is configured to change a display mode of the optical illusion image, according to the recognition of the driver on the caution-required feature.

14. The projection control apparatus according to claim 1, wherein the processing circuit is configured to determine whether alerting the caution-required feature is necessary, based on an automated driving level of the subject vehicle.

15. The projection control apparatus according to claim 1, wherein the processing circuit is configured to determine that alerting the caution-required feature is necessary when brightness around the subject vehicle is lower than or equal to a predefined threshold.

16. The projection control apparatus according to claim 1, wherein the processing circuit is configured to determine that alerting the caution-required feature is necessary when a headlamp or a width indicator of the subject vehicle is lit.

17. A projection control method, comprising:

detecting, by a processing circuit of a projection control apparatus, a caution-required feature that is a feature with a solid shape that impacts on traveling of a subject vehicle, the feature including a structure on a road, a road surface in a particular state, or an object not installed on a road;

generating, by the processing circuit, an optical illusion image having a different shape than the solid shape of the caution-required feature, the generated optical illusion image being an image to be perceived as if a feature existed through optical illusion when viewed from the driver of the subject vehicle;

determining, by the processing circuit, whether alerting the caution-required feature is necessary; and causing, by the processing circuit, a projector to project the optical illusion image at a position corresponding to a position of the caution-required feature determined as requiring the alert, wherein the generated optical illusion image is a protruding shape when the caution-required feature has a shape protruding from a road surface, and is a depressed shape when the caution-required feature has a shape depressed from a road surface, and wherein the optical illusion image is generated by perspective rendering computed from an eyepoint of the driver of the subject vehicle so that the generated optical illusion image projected on a road surface appears to the driver as a solid three-dimensional feature existing on the road surface.

* * * * *